United States Patent
Wang et al.

(10) Patent No.: US 12,438,695 B2
(45) Date of Patent: Oct. 7, 2025

(54) NODE GROUP-BASED DATA PROCESSING METHOD AND SYSTEM, DEVICE, AND MEDIUM

(71) Applicant: Tencent Technology (Shenzhen) Company Limited, Shenzhen (CN)

(72) Inventors: Caihua Wang, Shenzhen (CN); Yang Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 393 days.

(21) Appl. No.: 18/071,466

(22) Filed: Nov. 29, 2022

(65) Prior Publication Data

US 2023/0109352 A1 Apr. 6, 2023

Related U.S. Application Data

(63) Continuation of application No. PCT/CN2021/116129, filed on Sep. 2, 2021.

(30) Foreign Application Priority Data

Sep. 15, 2020 (CN) .......................... 202010966318.0

(51) Int. Cl.
 *H04L 9/00* (2022.01)
 *H04L 9/06* (2006.01)
 *H04L 9/30* (2006.01)

(52) U.S. Cl.
 CPC ............ *H04L 9/008* (2013.01); *H04L 9/0618* (2013.01); *H04L 9/3073* (2013.01); *H04L 2209/46* (2013.01)

(58) Field of Classification Search
 CPC ...... H04L 9/008; H04L 9/0618; H04L 9/3073
 (Continued)

(56) References Cited

U.S. PATENT DOCUMENTS

| 9,166,792 B2 | 10/2015 | Yamanaka et al. |
| 10,504,154 B1 | 12/2019 | Bonawitz et al. |

(Continued)

FOREIGN PATENT DOCUMENTS

| CN | 102710661 A | 10/2012 |
| CN | 104519071 A | 4/2015 |

(Continued)

OTHER PUBLICATIONS

Tencent Technology, ISR, PCT/CN2021/116129, Nov. 22, 2021, 2 pgs.

(Continued)

*Primary Examiner* — Dant B Shaifer Harriman
(74) *Attorney, Agent, or Firm* — Morgan, Lewis & Bockius LLP

(57) ABSTRACT

This application relates to a node group-based data processing method performed by a first node in the node group, and includes: constructing, according to a first user identifier, a mapping relationship for mapping the first user identifier to a target value; performing homomorphic encryption on a mapping parameter of the mapping relationship, to obtain a mapping parameter ciphertext, and transferring the mapping parameter ciphertext to the second node in the node group; receiving the reference value and the fragment information returned by the second node; and maintaining, when a result obtained after homomorphic decryption is performed on the reference value is consistent with the target value, the fragment information returned corresponding to the reference value, and triggering the first node to collect fragment information maintained in each first node, to aggregate the collected fragment information to obtain a user identifier intersection set of the node group.

17 Claims, 9 Drawing Sheets

(58) Field of Classification Search
USPC .......................................................... 713/153
See application file for complete search history.

(56) References Cited

U.S. PATENT DOCUMENTS

| | | | | |
|---|---|---|---|---|
| 10,878,108 | B1* | 12/2020 | Nicolas | .................. G06F 21/602 |
| 11,310,207 | B1* | 4/2022 | Davey | .................. H04L 63/0428 |
| 11,494,506 | B2* | 11/2022 | Patel | .................. G06F 21/6218 |
| 11,515,996 | B2* | 11/2022 | Sehrawat | .............. H04L 9/0618 |
| 2015/0149763 | A1* | 5/2015 | Kamara | .................. H04W 4/02 |
| | | | | 713/150 |
| 2015/0288665 | A1 | 10/2015 | El Emam et al. | |
| 2021/0391987 | A1* | 12/2021 | Badrinarayanan | ........ H04L 9/30 |
| 2022/0078023 | A1* | 3/2022 | Nicolas | .................. G06F 21/602 |
| 2024/0169074 | A1* | 5/2024 | Leung | ..................... G06F 21/53 |

FOREIGN PATENT DOCUMENTS

| | | |
|---|---|---|
| CN | 108768642 A | 11/2018 |
| CN | 110536263 A | 12/2019 |
| CN | 111193701 A | 5/2020 |
| CN | 111401558 A | 7/2020 |
| CN | 111931253 A | 11/2020 |
| WO | WO 2019/204711 A1 | 10/2019 |

OTHER PUBLICATIONS

Mihaela Ion et al., "On Deploying Secure Computing Commercially: Private Intersection- Sum Protocols and their Business Applications", International Association for Cryptologic Research (IACR), Jun. 18, 2019, XP061032910, 48 pgs., Retrieved from the Internet: https://eprint.iacr.org/2019/723.pdf.
Tencent Technology, Extended European Search Report and Supplementary Search Report, EP21868458.7, Aug. 14, 2023, 10 pgs.
Tencent Technology, WO, PCT/CN2021/116129, Nov. 22, 2021, 5 pgs.
Tencent Technology, IPRP, PCT/CN2021/116129, Mar. 21, 2023, 6 pgs.

* cited by examiner

NODE GROUP-BASED DATA PROCESSING METHOD AND SYSTEM, DEVICE, AND MEDIUM

CROSS-REFERENCE TO RELATED APPLICATIONS

This application is a continuation application of PCT Patent Application No. PCT/CN2021/116129, entitled "DATA PROCESSING METHOD AND SYSTEM BASED ON NODE GROUP, AND DEVICE AND MEDIUM" filed on Sep. 2, 2021, which claims priority to Chinese Patent Application No. 202010966318.0, filed with the State Intellectual Property Office of the People's Republic of China on Sep. 15, 2020, and entitled "NODE GROUP-BASED DATA PROCESSING METHOD AND SYSTEM, DEVICE, AND MEDIUM", all of which are incorporated herein by reference in their entirety.

FIELD OF THE TECHNOLOGY

This application relates to the field of computer technologies, and in particular, to a node group-based data processing method and apparatus, a device, and a medium.

BACKGROUND OF THE DISCLOSURE

With the development of computer technologies, it is more common to process data on the Internet. Private set intersection is one of basic problems researched in the field of secure multi-party computation, for a plurality of participants, each participant has a private data set, and an objective is to enable all the participants to obtain a public intersection set of the sets and ensure that content in a non-intersection set is not leaked.

In the conventional technology, a data processing party has excessive access to private data, which is easy to cause security risks.

SUMMARY

According to various embodiments of this application, a node group-based data processing method and system, a device, and a medium are provided.

A node group-based data processing method is performed by a first node in the node group, the method including: constructing a mapping relationship according to a first user identifier of the first node, the mapping relationship being used for mapping the first user identifier to a target value; performing homomorphic encryption on a mapping parameter of the mapping relationship, to obtain a mapping parameter ciphertext, and transferring the mapping parameter ciphertext to a second node in the node group, the mapping parameter ciphertext being used for instructing the second node to determine a reference value to which a second user identifier of the second node is mapped under a mapping relationship corresponding to the mapping parameter ciphertext and correspondingly feedback one piece of fragment information of the second user identifier corresponding to the reference value and the reference value to the first node; receiving the reference value and the fragment information that are correspondingly returned by the second node; and maintaining, when a result obtained after homomorphic decryption is performed on the reference value is consistent with the target value, the fragment information returned corresponding to the reference value, and triggering the first node to collect fragment information maintained in each node in the node group, to aggregate the collected fragment information to obtain a user identifier intersection set of nodes in the node group and aggregate user data corresponding to the user identifier intersection set.

A node group-based data processing method is provided, executed by a second node in the node group, the method including: receiving mapping parameter ciphertexts respectively transmitted by a plurality of first nodes in the node group, mapping relationships corresponding to mapping parameter cleartexts obtained by performing homomorphic decryption on the mapping parameter ciphertexts being used for mapping first user identifiers of the first nodes from which the mapping parameter ciphertexts originate to target values; splitting a local second user identifier into a plurality of pieces of fragment information; and determining, for each mapping parameter ciphertext, a reference value to which the local second user identifier is mapped under a mapping relationship corresponding to the mapping parameter ciphertext, and correspondingly feeding back one piece of fragment information of the second user identifier corresponding to the reference value and the reference value to a first node from which the mapping parameter ciphertext originates, the reference value and the fragment information that are correspondingly returned to the first node being used for indicating that the first node maintains, when a result obtained after homomorphic decryption is performed on the reference value is consistent with the target value, the fragment information returned corresponding to the reference value, and triggers one first node in the node group to collect fragment information maintained in each first node, to aggregate the collected fragment information to obtain a user identifier intersection set of nodes in the node group and aggregate user data corresponding to the user identifier intersection set.

A node group-based data processing system is provided, a node group to which the system is applicable including a plurality of first nodes and one second node, the first node being configured to construct a mapping relationship according to a first user identifier; and perform homomorphic encryption on a mapping parameter of the mapping relationship, to obtain a mapping parameter ciphertext, and transfer the mapping parameter ciphertext to a second node in the node group, the mapping relationship being used for mapping the first user identifier to a target value; the second node being configured to receive mapping parameter ciphertexts respectively transmitted by the plurality of first nodes in the node group; split a local second user identifier into a plurality of pieces of fragment information; and determine, for each mapping parameter ciphertext, a reference value to which the local second user identifier is mapped under a mapping relationship corresponding to the mapping parameter ciphertext, and correspondingly return one piece of fragment information of the second user identifier corresponding to the reference value and the reference value to a first node from which the mapping parameter ciphertext originates; and the first node being further configured to receive the reference value and the fragment information that are correspondingly returned by the second node; and maintain, when a result obtained after homomorphic decryption is performed on the reference value is consistent with the target value, the fragment information returned corresponding to the reference value, and trigger one first node in the node group to collect fragment information maintained in each first node, to aggregate the collected fragment information to obtain a user identifier intersection set of nodes in the node group and aggregate user data corresponding to the user identifier intersection set.

A computer device is provided, including a memory and a processor, the memory storing computer-readable instructions, the processor, when executing the computer-readable instructions, implementing operations of the node group-based data processing method.

One or more non-volatile storage media storing computer-readable instructions are provided, the computer-readable instructions, when executed by one or more processors, implementing operations of the node group-based data processing method.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
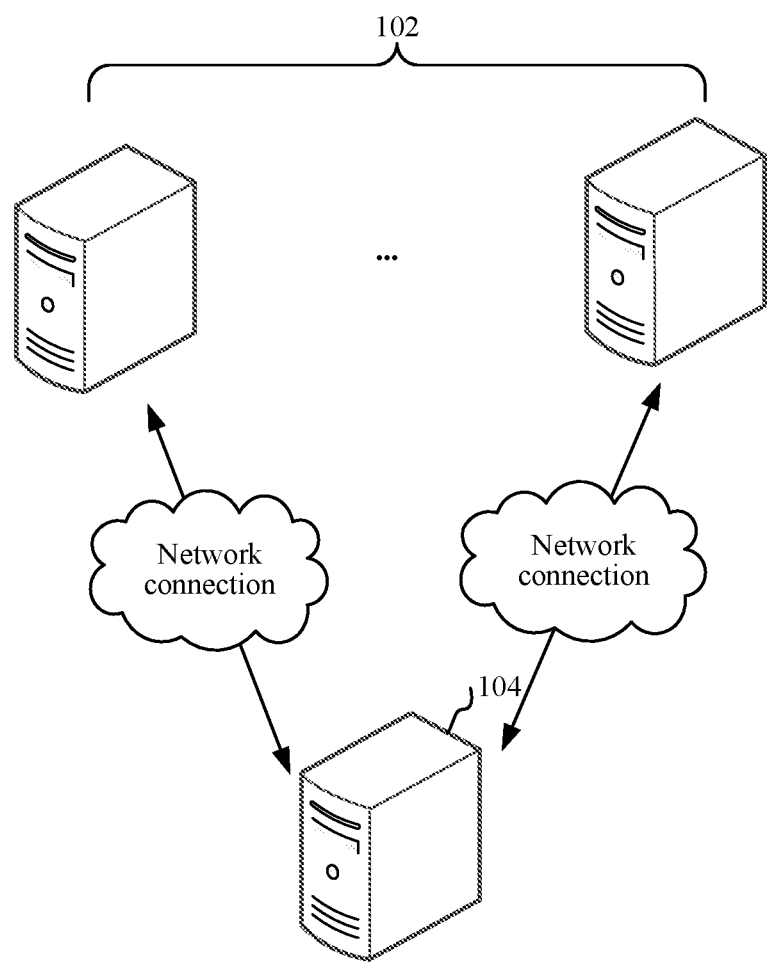
FIG. 1 is a diagram of an application environment of a node group-based data processing method in an embodiment.

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

ML is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving performance of the computer. The ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application relate to technologies such as ML or AI, and are specifically described by using the following embodiments.

The node group-based data processing method provided in this application is applicable to the application environment shown in FIG. 1. In an embodiment, a node group is a set of a plurality of nodes, and the node group includes computer devices (nodes for short below) of two role types, which are first nodes 102 and a second node 104. There may be more than one first node and one second node. Any node in the node group may be used as the first node or may be used as the second node. The first node may communicate with the second node through a network. Nodes in the node group are independent of each other. In an embodiment, the nodes in the node group do not have a trust relationship between each other.

Specifically, the first node may be configured to construct a mapping relationship according to a first user identifier; and perform homomorphic encryption on a mapping parameter of the mapping relationship, to obtain a mapping parameter ciphertext, and transfer the mapping parameter ciphertext to the second node in the node group, the mapping relationship being used for mapping the first user identifier to a target value. The second node may be configured to receive mapping parameter ciphertexts respectively transmitted by a plurality of first nodes in the node group; split a local second user identifier into a plurality of pieces of fragment information; and determine, for each mapping parameter ciphertext, a reference value to which the local second user identifier is mapped under a mapping relationship corresponding to the mapping parameter ciphertext, and correspondingly return one piece of fragment information of the second user identifier corresponding to the reference value and the reference value to a first node from which the mapping parameter ciphertext originates, a quantity of pieces of fragment information of each second user identifier being the same as a quantity of first nodes in the node group, so that each piece of fragment information is returned to each first node. The first node may be further configured to receive the reference value and the fragment information that are correspondingly returned by the second node; and maintain, when a result obtained after homomorphic decryption is performed on the reference value is consistent with the target value, the fragment information returned corresponding to the reference value, and trigger one first node in the node group to collect fragment information maintained in each first node, to aggregate the collected fragment information to obtain a user identifier intersection set of nodes in the node group and aggregate user data corresponding to the user identifier intersection set.

In an embodiment, the node group may further include a node of a role type: an aggregation node. The aggregation node is one first node in the node group. The aggregation node may communicate with another first node through a network. The aggregation node is configured to receive maintained fragment information transmitted by another first node in the node group; aggregate, when a quantity of pieces of fragment information corresponding to a same fragment identifier reaches a quantity of first nodes, the fragment information corresponding to the same fragment identifier, to obtain a public user identifier of the nodes in the node group; and obtain the user identifier intersection set of the nodes in the node group according to the public user identifier, to aggregate the user data corresponding to the user identifier intersection set.

In an embodiment, the aggregated user data corresponding to the user identifier intersection set may be used as a training sample of a machine learning model.

The node may be an independent physical server, or may be a server cluster comprising a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Figure 2:
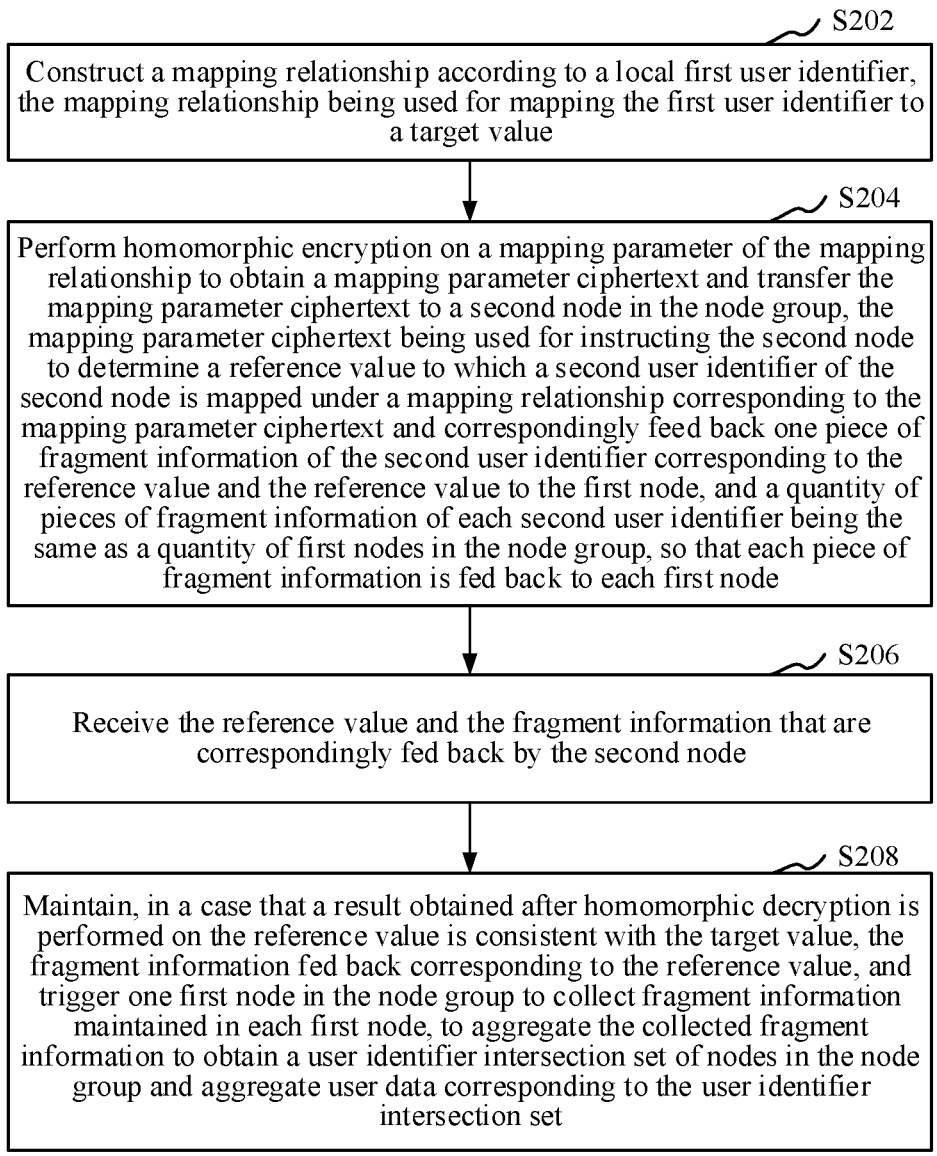
FIG. 2 is a schematic flowchart of a node group-based data processing method in an embodiment.

In an embodiment, as shown in FIG. 2, a node group-based data processing method is provided, and a description is made by using an example in which the method is applicable to one first node in the node group shown in FIG. 1. The node group-based data processing method includes the following steps.

Step 202. Construct a mapping relationship according to a first user identifier, the mapping relationship being used for mapping the first user identifier to a target value.

The first user identifier is a user identifier stored in the first node. The user identifier is used for uniquely identifying one user. It may be understood that in this application, each node in the node group stores a user identifier and user data stored corresponding to the user identifier. There is more than one first node in the node group, a user identifier in each first node may be collectively referred to as a first user identifier, but the first user identifiers correspond to different first nodes.

Figure 3:
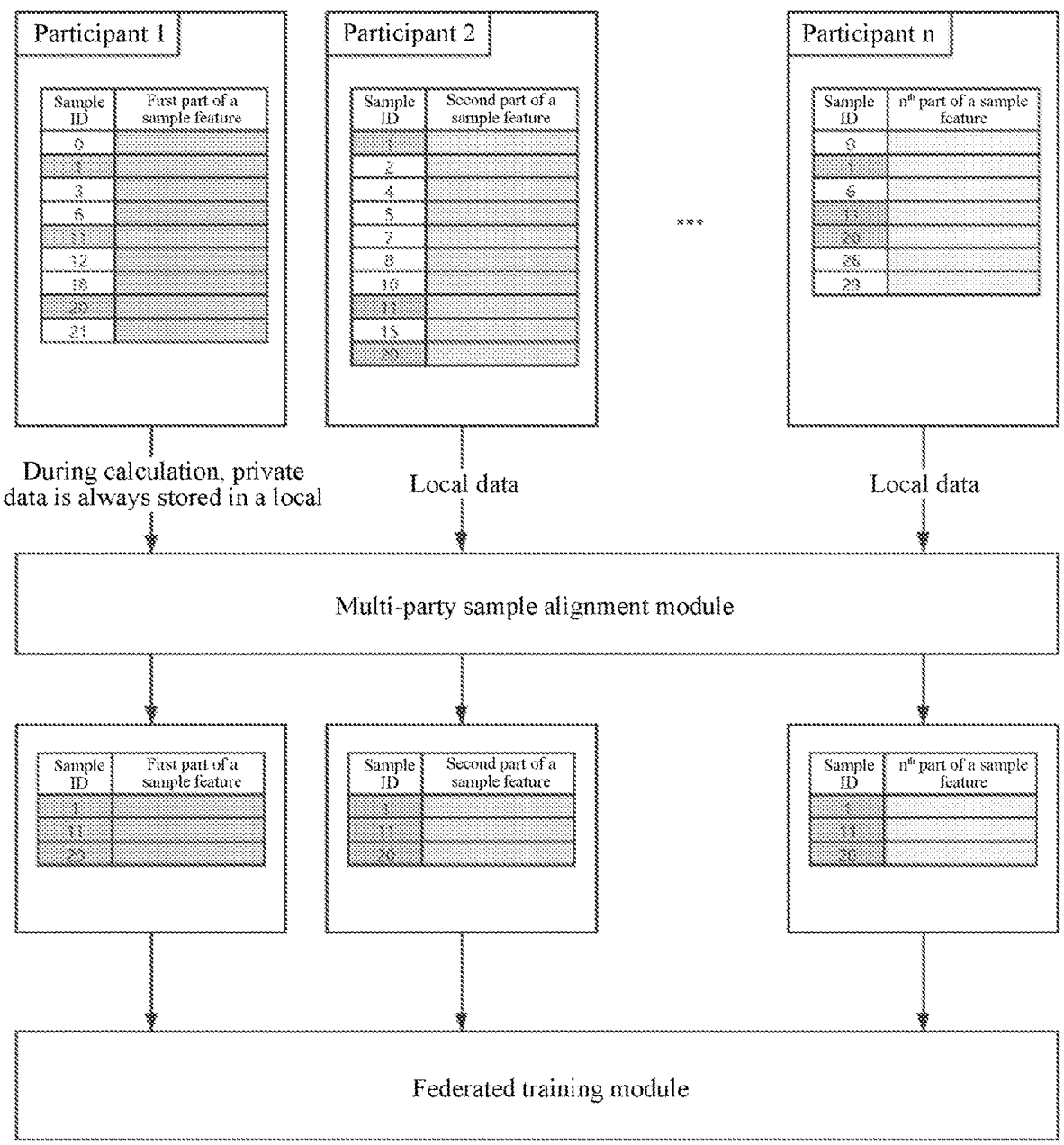
FIG. 3 is a schematic diagram of application of a node group-based data processing method in an embodiment.

For example, FIG. 3 is a schematic diagram of application of a node group-based data processing method in an embodiment. Referring to FIG. 3, it can be learned that a node group includes at least a first node F1 (a participant 1) and a first node F2 (a participant 2). The first node F1 includes first user identifiers (sample IDs) such as 0, 1, 3, 6, and 11. The first node F2 includes first user identifiers (sample IDs) such as 1, 2, 4, 5, and 7.

A mapping relationship is a correspondence between elements in two element sets. For example, two element sets A and B have a correspondence, and there is always a unique element b in the element set B corresponding to each element a in the element set A. Therefore, the correspondence is a mapping relationship from A to B. The mapping relationship involved in this application is used for mapping first user identifiers in one element set to target values in another element set. The target values may be specifically one or more specific values.

Specifically, any first node in the node group may obtain a first user identifier and a target value to which the first user identifier is to be mapped and directly construct a mapping relationship based on the first user identifier or process the first user identifier and then construct a mapping relationship based on a result obtained by processing.

In an embodiment, there are at least two first nodes in the node group.

Step 204. Perform homomorphic encryption on a mapping parameter of the mapping relationship, to obtain a mapping parameter ciphertext, and transfer the mapping parameter ciphertext to a second node in the node group, the mapping parameter ciphertext being used for instructing the second node to determine a reference value to which a second user identifier of the second node is mapped under a mapping relationship corresponding to the mapping parameter ciphertext and correspondingly return one piece of fragment information of the second user identifier corresponding to the reference value and the reference value to the first node, and a quantity of pieces of fragment information of each second user identifier being the same as a quantity of first nodes in the node group, so that each piece of fragment information is returned to each first node.

The mapping parameter is a parameter used for describing the mapping relationship. The mapping parameter is used for uniquely determining one mapping relationship. The homomorphic encryption is a cryptography technology based on the computational complexity theory of mathematical problems. Data on which homomorphic encryption is performed is processed to obtain an output, homomorphic decryption is performed on the output, and a decryption result is the same as an output obtained by performing the same processing on unencrypted original data. The mapping parameter ciphertext is a result after homomorphic encryption is performed on the mapping parameter of the mapping relationship. The mapping parameter ciphertext may also be used for uniquely determining one mapping relationship, and the mapping relationship is different from the mapping relationship determined according to the mapping parameter.

The second user identifier is a user identifier stored in the second node. The reference value to which the second user identifier of the second node is mapped under the mapping relationship corresponding to the mapping parameter ciphertext may be a value to which the second user identifier of the second node is directly mapped under the mapping relationship corresponding to the mapping parameter ciphertext; or may be a reference value to which a result obtained after the second user identifier is processed is mapped under the mapping relationship corresponding to the mapping parameter ciphertext. The fragment information is a part of information about the second user identifier and may be obtained by splitting the second user identifier or may be obtained by splitting data obtained after the second user identifier is processed.

For example, continuing to refer to FIG. 3, it can be learned that the node group includes a second node S (a participant n). The second node S includes second user identifiers (sample IDs) such as 0, 1, 6, 11, and 20.

Specifically, after constructing the mapping relationship, any first node in the node group may perform homomorphic encryption on a mapping parameter of the mapping relationship to obtain a mapping parameter ciphertext and then transfer the mapping parameter ciphertext to a second node in the node group. After receiving the mapping parameter ciphertext, the second node determines a mapping relationship based on the mapping parameter ciphertext and determines a reference value to which a local second user identifier is mapped under the mapping relationship. The second node correspondingly feeds back the reference value and the second user identifier from which the reference value originates to the first node.

A quantity of pieces of fragment information of each second user identifier is the same as a quantity of first nodes in the node group. Therefore, after receiving a mapping parameter ciphertext transmitted by each first node and determining a reference value to which a second user identifier is mapped under a mapping relationship corresponding to each mapping parameter ciphertext, the second node feeds back each reference value and one piece of fragment information to each first node after each reference value corresponds to the one piece of fragment information. That is, the reference value and the fragment information are returned in pair.

For example, it is assumed that the node group includes two first nodes F1 and F2 and a second node S. F1 constructs a mapping relationship Y1 according to a local first sample identifier, performs homomorphic encryption on a mapping parameter ym1 of Y1, to obtain ys1, and transfers ys1 to S. F2 constructs a mapping relationship Y2 according to a local first sample identifier, performs homomorphic encryption on a mapping parameter ym2 of Y2, to obtain ys2, and transfers ys2 to S. After receiving ys1 and ys2, S respectively determines reference values to which a local second user identifier is mapped under mapping relationships corresponding to ys1 and ys2. For example, for a second user identifier SID1, the second node may split SID1 to obtain two pieces of fragment information P11 and P12, determine a reference value C11 to which SID1 is mapped under the mapping relationship corresponding to ys1, and transmit C11 and P11 (or P12) as a data pair to F1; and determine a reference value C12 to which SID1 is mapped under the mapping relationship corresponding to ys2, and transmit C12 and P12 (or P11) as a data pair to F2. The plurality of first nodes are not limited to simultaneously transmitting mapping parameter ciphertexts to the second node. The second may respectively receive the mapping parameter ciphertexts. After receiving each mapping parameter ciphertext, the second node may perform subsequent processing without waiting for receiving the mapping parameter ciphertexts transmitted by all the first node before performing the subsequent processing.

Step 206. Receive the reference value and the fragment information that are correspondingly returned by the second node.

Specifically, any first node in the node group may receive a plurality of data pairs returned by the second node. A quantity of data pairs is the same as a quantity of second user identifiers of the second node. Each data pair includes one reference value and one piece of fragment information. A reference value in one data pair is obtained by mapping a second user identifier to which fragment information in the data pair belongs.

In another embodiment, before step 202, an intersection set of user identifiers of nodes in the node group may be first rapidly and approximately obtained, some sample identifiers that do not belong to the intersection set are filtered out, and an intersection set of the remaining user identifiers after the filtering is accurately obtained by performing the node group-based data processing method provided in this application. Therefore, in this case, the quantity of data pairs received by the first node is less than the quantity of second user identifiers of the second node.

Step 208. maintain, when a result obtained after homomorphic decryption is performed on the reference value is consistent with the target value, the fragment information returned corresponding to the reference value, and trigger one first node in the node group to collect fragment information maintained in each first node, to aggregate the collected fragment information to obtain a user identifier intersection set of nodes in the node group and aggregate user data corresponding to the user identifier intersection set.

It may be understood that data on which homomorphic encryption is performed is processed to obtain an output, homomorphic decryption is performed on the output, and a decryption result is the same as an output obtained by performing the same processing on unencrypted original data. Therefore, after receiving the reference value and the fragment information that are correspondingly returned by the second node, the first node may perform homomorphic decryption on the reference value. A decryption result after the homomorphic decryption is consistent with (e.g., matches) a value to which a second user identifier from which the reference value originates is mapped under the mapping relationship corresponding to the mapping parameter ciphertext, and the decryption result may be compared with the target value based on this, to determine whether a user identifier shared by a local and the second node exists.

Specifically, when a decryption result obtained after homomorphic decryption is performed on the reference value is consistent with (e.g., matches) the target value, it is determined that the user identifier from which the reference value originates is a user identifier shared by a local and the second node.

The maintained fragment information is used for indicating that the user identifier from which the fragment information originates is a user identifier shared by at least two nodes. Further, when determining that a received user identifier from which a reference value originates is the user identifier shared by the local and the second node, the first node maintains fragment information received corresponding to the reference value. Subsequently, the first node may trigger one first node in the node group to collect fragment information maintained in each first node, to recover a public user identifier according to the fragment information after collecting all the fragment information of the public user identifier, so as to obtain a user identifier intersection set of the nodes in the node group, so that user data corresponding to the user identifier intersection set may be aggregated for subsequent processing steps. For example, the user data is used as a model training data. In another embodiment, when determining that a received user identifier from which a reference value originates is the user identifier shared by the local and the second node, the first node may alternatively mark fragment information received corresponding to the reference value as a valid fragment.

For example, it is assumed that the node group includes a first node F1 and a second node S. F1 constructs a mapping relationship Y1 according to a local first sample identifier, performs homomorphic encryption on a mapping parameter ym1 of Y1, to obtain ys1, and transfers ys1 to S. After receiving ys1, S determines a reference value C11 to which a local second user identifier SID1 is mapped under a mapping relationship corresponding to ys1 and correspondingly feeds back C11 and one piece of fragment information P11 of SID1 to the first node F1. After receiving C11 and P11 that are correspondingly returned, the first node performs homomorphic decryption on C11 to obtain D11 and compares D11 with a target value M. When D11=M, the first node determines that SID1 is a user identifier shared by the first node F1 and the second node S and maintains P11 returned corresponding to C11.

In some embodiments, when the decryption result obtained after homomorphic decryption is performed on the reference value is inconsistent with (e.g., does not match) the target value, it is determined that the user identifier from which the reference value originates is not the first user identifier. In this case, the first node may discard the fragment information returned corresponding to the reference value, set the fragment information to zero, or mark the fragment information as an invalid fragment.

For example, after receiving C11 and P11 that are correspondingly returned, the first node performs homomorphic decryption on C11 to obtain D11 and compares D11 with the target value M. When D11 is not equal to M, the first node determines that SID1 is not the user identifier shared by the first node F1 and the second node S and set P11 returned corresponding to C11 to zero.

Based on the node group-based data processing method, a first node in a node group constructs a mapping relationship according to a first user identifier, the mapping relationship being used for mapping the first user identifier to a target value. Therefore, after the first node performs homomorphic encryption on a mapping parameter of the mapping relationship to obtain a mapping parameter ciphertext and transfers the mapping parameter ciphertext to a second node in the node group, the second node may perform a homomorphic operation based on a local second user identifier under a ciphertext space, to obtain a reference value to which the second user identifier is mapped under a mapping relationship corresponding to the mapping parameter ciphertext, and then return one piece of fragment information of the second user identifier corresponding to the reference value and the reference value to the first node together. The first node maintains, when a result obtained after homomorphic decryption is performed on the reference value is consistent with the target value, the fragment information returned corresponding to the reference value, and triggers one first node in the node group to collect fragment information maintained in each first node, to aggregate the collected fragment information to obtain a user identifier intersection set of nodes in the node group and aggregate user data corresponding to the user identifier intersection set. Therefore, on one hand, because the first node transmits the mapping parameter ciphertext to the second node, the second node cannot reversely deduce the first user identifier of the first node through the ciphertext, and the homomorphic encryption provides a function of processing encrypted data, so that an operation may be performed on the ciphertext without obtaining a cleartext, and decryption is equivalent to performing a corresponding operation on the cleartext, to ensure a verification effect of the reference value and the target value of the first node. On the other hand, because a quantity of pieces of fragment information of each second user identifier is the same as a quantity of first nodes in the node group, the fragment information of each second user identifier is respectively returned to the first nodes, and the first node does not obtain a complete second user identifier of the second node. In addition to the finally obtained user identifier intersection set of the nodes in the node group, each node cannot steal privacy information of another node through own obtained information, thereby ensuring security of private data of each node and performing data processing without introducing a third party.

The mapping relationship constructed by the first node according to the first user identifier is only used for mapping a first user identifier to a target value. Therefore, when a result obtained after homomorphic decryption is performed on a returned reference value is consistent with the target value, it may be determined that a user identifier the same as the local exists in the second node.

In an embodiment, the constructing a mapping relationship according to a first user identifier includes: converting the first user identifier into an intermediate value; and constructing a target polynomial by using the intermediate value as a solution of a polynomial, the target polynomial being used for mapping the first user identifier to a uniform target value, and the target value being zero. The performing homomorphic encryption on a mapping parameter of the mapping relationship, to obtain a mapping parameter ciphertext, and transferring the mapping parameter ciphertext to a second node in the node group includes: performing homomorphic encryption on a polynomial coefficient of the target polynomial, to obtain a polynomial coefficient ciphertext, and transferring the polynomial coefficient ciphertext to the second node in the node group.

The intermediate value is an intermediate value used for constructing a polynomial based on a user identifier. The polynomial is an algebraic expression obtained by multiplying a plurality of monomials, and each monomial is obtained according to one intermediate value. The target polynomial constructed by using the intermediate value as the solution of the polynomial is used for mapping the first user identifier to the uniform target value, that is, zero.

Specifically, the first node may construct a target unary polynomial by using an intermediate value as a solution of a unary polynomial, the target unary polynomial being used for mapping a first user identifier to a uniform target value, and the target value being zero.

For example, it is assumed that intermediate values to which the first node F1 converts the first user identifiers include: h1, h2, h3, . . . , hi, . . . , and hn, n being a quantity of first user identifiers of the first node F1. The first node F1 obtains a monomial such as y1=(x−h1) or y2=(x−h2) according to each intermediate value. The monomials are multiplied to obtain a target polynomial.

$$\text{Poly}=(x-h1)*(x-h2)*\ldots*(x-hn)=\Pi_{i=1}^{n}(x-hi)$$

In an embodiment, the converting the first user identifier into an intermediate value includes: obtaining a conversion function shared by the nodes in the node group; and converting the first user identifier into the intermediate value by using the conversion function, so that same user identifiers of the nodes in the node group are converted into a same intermediate value.

The conversion function shared by the nodes in the node group is a function uniformly used by the nodes in the node group for converting user identifiers into natural numbers.

The conversion function may be specifically a hash function or an encrypted hash function. The hash function may also be referred to as a hash function and may compress an input of any length as an output of a preset length, and the output stage is a hash value.

Specifically, the first node may input a first user identifier into the conversion function shared by the nodes in the node group, to obtain a converted intermediate value. Alternatively, the first node may offset a first user identifier and then input the offset first user identifier into the conversion function shared by the nodes in the node group, to obtain a converted intermediate value. An offset obtained by offsetting the first user identifier is an offset shared by the nodes in the node group.

In this embodiment, because the nodes in the node group share the conversion function, intermediate values obtained by converting same user identifiers of different nodes through the conversion function are the same. Therefore, this provides a guarantee for the subsequent tracing of a user identifier based on fragment information.

Further, after constructing the target polynomial, the first node may expand the target polynomial into an algebraic expression obtained by adding a plurality of monomials, then obtains a polynomial coefficient of the expanded target polynomial, performs homomorphic encryption on the polynomial coefficient to obtain a polynomial coefficient ciphertext, and transfers the polynomial coefficient ciphertext to the second node in the node group. Because the algebraic expression obtained by adding the plurality of monomials may be uniquely determined by using a coefficient of each monomial, the polynomial coefficient of the expanded target polynomial may be used for uniquely determining the expanded target polynomial, and the polynomial coefficient ciphertext may also be used for uniquely determining another polynomial.

For example, the first node may specifically perform an operation and mapping on local first sample identifiers by using the hash function, to obtain hash values of the first sample identifiers, and generate a unary polynomial of n degree by using the hash values as roots (n is a quantity of first sample identifiers). The polynomial is generated by using an operation of big integer without loss of accuracy. The first node then expands the polynomial to obtain a polynomial coefficient and encrypts and transmits the polynomial coefficient to the second node.

In the foregoing embodiments, by using an oblivious transfer idea, an intermediate value to which a user identifier is converted is used as a solution of a polynomial to construct a target polynomial, and then a coefficient of the target polynomial is homomorphically encrypted and transmitted to the second node. The second node performs oblivious polynomial evaluation in a ciphertext space and the feeds back a result of the evaluation to the first node. In this way, the first node compares a user identifier of the second node with a local user identifier without transferring a coefficient cleartext and leaking private data, to determine fragment information of a user identifier shared by a local and the second node, thereby performing private set intersection on multiple parties.

In an embodiment, the performing homomorphic encryption on a mapping parameter of the mapping relationship, to obtain a mapping parameter ciphertext, and transferring the mapping parameter ciphertext to a second node in the node group includes: obtaining a local key pair generated in a homomorphic encryption manner, the key pair including a public key and a private key; and performing homomorphic encryption on the mapping parameter of the mapping relationship by using the public key, to obtain the mapping parameter ciphertext, and transferring the mapping parameter ciphertext to the second node in the node group. Step 208 includes: maintaining, when the result obtained after homomorphic decryption is performed on the reference value by using the private key is consistent with the target value, the fragment information returned corresponding to the reference value, and triggering the first node in the node group to collect the fragment information maintained in each first node, to aggregate the collected fragment information to obtain the user identifier intersection set of the nodes in the node group and aggregate the user data corresponding to the user identifier intersection set.

Specifically, any first node in the node group may generate a local key pair in a homomorphic encryption manner, the key pair including a public key PK and a private key SK. The homomorphic encryption manner may be specifically an exponential ElGamal cryptosystem. The exponential ElGamal cryptosystem has a homomorphic operation function and may perform an operation on a ciphertext without obtaining a cleartext, and the decryption is equivalent to performing an addition or scalar multiplication operation on a cleartext.

Further, after constructing the mapping relationship, the first node performs homomorphic encryption on the mapping parameter of the mapping relationship by using the public key, to obtain the mapping parameter ciphertext, and transfers the mapping parameter ciphertext to the second node in the node group. After receiving a reference value returned by the second node, the first node performs homomorphic decryption on the reference value by using the private key and then compares a result after the decryption with the target value.

In this embodiment, each first node generates an own public-private key pair, and an encryption process has randomness. The second node cannot reversely deduce whether a corresponding cleartext is a target value by using a reference value in a ciphertext space, thereby ensuring that a user identifier of the first node is not leaked to the second node and protecting privacy of data in a non-intersection set.

In an embodiment, step 208 includes: performing homomorphic decryption on the reference value to obtain a decryption result; and maintaining, when the decryption result is consistent with the target value, the fragment information returned corresponding to the reference value, which is marked as fragment information, and correspondingly transferring the maintained fragment information and the decryption result indicating that verification succeeds to an aggregation node, the transferred fragment information being used for being aggregated in the aggregation node to obtain the user identifier intersection set of the nodes in the node group, so as to aggregate the user data corresponding to the user identifier intersection set, and the aggregation node being one first node in the node group.

In an embodiment, the aggregated user data corresponding to the user identifier intersection set may be used as a training sample of a machine learning model.

It may be understood that an objective of this application is to obtain the user identifier intersection set of the nodes in the node group. When the user identifier intersection set is obtained, the nodes in the node group are divided into two categories, one category is a first node, and there are a plurality of first nodes; and the other category is a second node, and there is only one second node. Each first node generates a mapping relationship according to a first user identifier. The mapping relationship may be used for mapping a first user identifier to a target value. In addition, the first node performs homomorphic encryption on a mapping parameter of the mapping relationship to obtain a mapping parameter ciphertext and then transfers the mapping parameter ciphertext to the second node. The second node determines, for a mapping parameter ciphertext transferred by each first node, a reference value to which a local second user identifier is mapped under a mapping relationship corresponding to the mapping parameter ciphertext, and splits the second user identifier into a plurality of pieces of fragment information, a quantity of pieces of fragment information being the same as a quantity of first nodes.

Therefore, the second node synchronously feeds back one piece of fragment information while feeding back the reference value, to distribute the fragment information of the second user identifier to each first node. Each first node determines, according to the reference value, whether there is a user identifier shared with a local on the second node, and maintains fragment information of the shared user identifier. However, because the first node obtains only the fragment information, the first node does not learn the complete user identifier.

Therefore, in this case, one node is required to aggregate the maintained fragment information. Specifically, one first node in the node group may be used as an aggregation node. The aggregation node is configured to aggregate the maintained fragment information to obtain a user identifier intersection set of the nodes in the node group, to aggregate user data corresponding to the user identifier intersection set, the user data being used for data processing, for example, being used as a training sample of a machine learning model.

If the second node is used as the aggregation node, the second node may obtain a user identifier intersection set of the second node and any first node, but the first node cannot obtain a user identifier intersection set of the first node and the second node. In this case, it is unfair to the first node and the second node. When the first node is used as the aggregation node, the first node can obtain the user identifier intersection set after aggregating the fragment information, and the obtained user identifier intersection set is the user identifier intersection set of the nodes. Therefore, the aggregation node can be selected from only the first nodes.

Therefore, for the first nodes that are not selected as the aggregation node, the first nodes may transmit the maintained fragment information to the aggregation node. Then, the aggregation node performs an aggregation operation.

For example, it is assumed that one first node F1 in the node group receives three data pairs (C31, P32), (C11, P11), and (C21, P13) returned by the second node. The first node F1 may perform homomorphic decryption on reference values in the three data pairs and then compare decryption results with the target value M. J31 is obtained by performing homomorphic decryption on C31, J11 is obtained by performing homomorphic decryption on C11, and J21 is obtained by performing homomorphic decryption on C21. It is assumed that J31=J11=M and J21 is not equal to M, the first node F1 may maintain P32 and P11, and transmit the maintained P32 and P11 to the aggregation node.

In the foregoing embodiments, encryption and decryption of private data are distributed to the nodes, fragment information is aggregated by using one first node, to finally obtain a complete intersection set. Complete information cannot be reversely deduced by using the fragment information, and only the fragment information that is successfully verified may be transmitted to the aggregation node. Therefore, each node cannot steal private data of another node by using own obtained information, to protect privacy of data in a non-intersection set.

Figure 4:
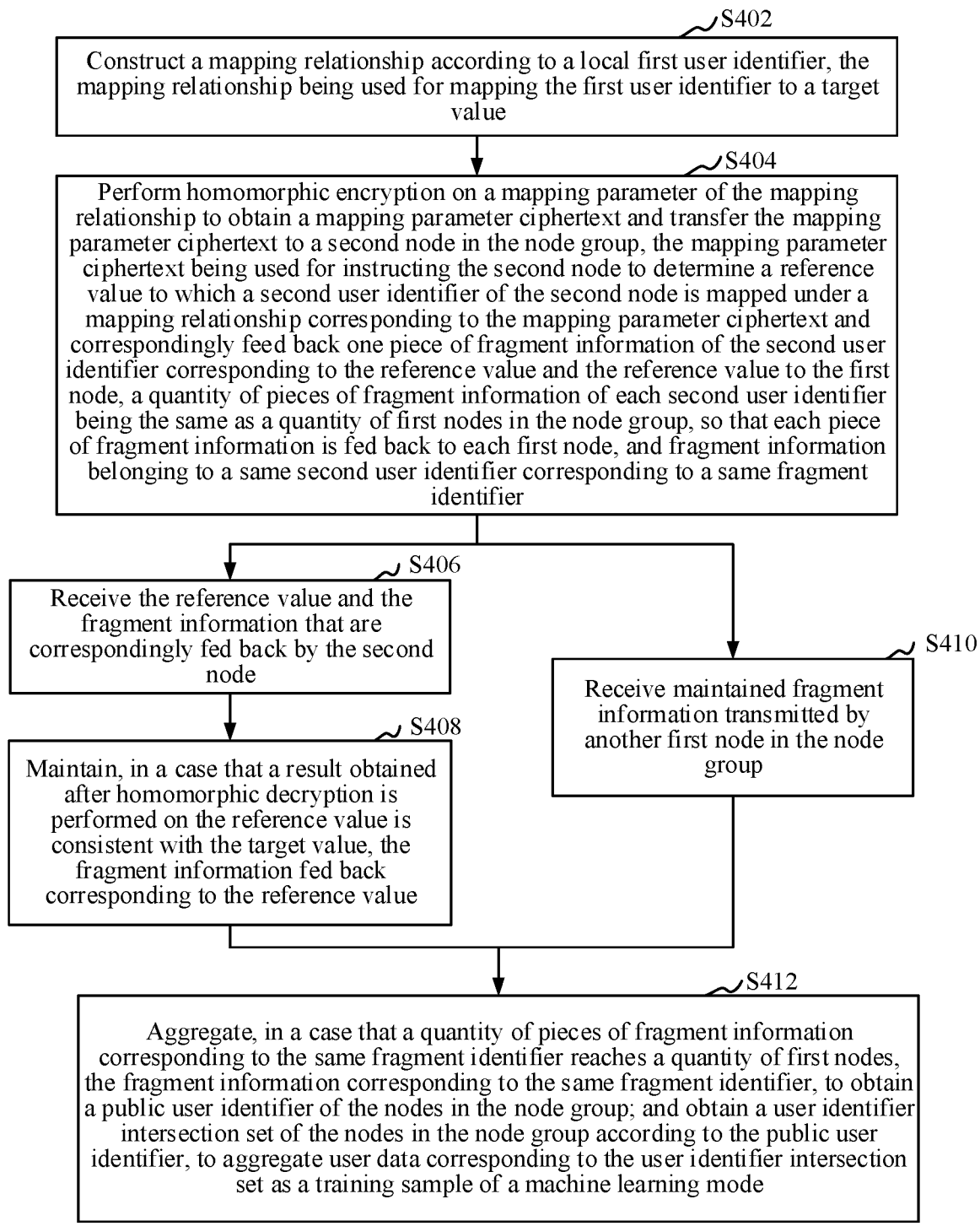
FIG. 4 is a schematic flowchart of a node group-based data processing method in another embodiment.

In an embodiment, as shown in FIG. 4, a node group-based data processing method is provided, and a description is made by using an example in which the method is applicable to a first node that is selected as an aggregation node in the node group shown in FIG. 1. The method includes the following steps.

Step 402. Construct a mapping relationship according to a first user identifier, the mapping relationship being used for mapping the first user identifier to a target value.

Step 404. Perform homomorphic encryption on a mapping parameter of the mapping relationship, to obtain a mapping parameter ciphertext, and transfer the mapping parameter ciphertext to a second node in the node group, the mapping parameter ciphertext being used for instructing the second node to determine a reference value to which a second user identifier of the second node is mapped under a mapping relationship corresponding to the mapping parameter ciphertext and correspondingly return one piece of fragment information of the second user identifier corresponding to the reference value and the reference value to the first node, a quantity of pieces of fragment information of each second user identifier being the same as a quantity of first nodes in the node group, so that each piece of fragment information is returned to each first node, and fragment information belonging to a same second user identifier corresponding to a same fragment identifier.

Step 406. Receive the reference value and the fragment information that are correspondingly returned by the second node.

Step 408. maintain, when a result obtained after homomorphic decryption is performed on the reference value is consistent with the target value, the fragment information returned corresponding to the reference value.

Step 410. Receive maintained fragment information transmitted by another first node in the node group.

Step 412. Aggregate, when a quantity of pieces of fragment information corresponding to the same fragment identifier reaches the quantity of first nodes, the fragment information corresponding to the same fragment identifier, to obtain a public user identifier of the nodes in the node group; and obtain a user identifier intersection set of the nodes in the node group according to the public user identifier, to aggregate user data corresponding to the user identifier intersection set as a training sample of a machine learning mode.

The fragment information belonging to the same second user identifier corresponds to the same fragment identifier. Therefore, the aggregation node may aggregate the fragment information belonging to the same second user identifier according to the fragment identifier, to complete tracing from the fragment information to a complete user identifier.

Specifically, the aggregation node receives maintained fragment information transmitted by another first node in the node group, then clusters the fragment information according to a fragment identifier, and counts whether a quantity of pieces of each group of fragment information reaches the quantity of first nodes. When the quantity of pieces of fragment information corresponding to the same fragment identifier reaches the quantity of first nodes, the aggregation node determines that the user identifier of the fragment information is a user identifier shared by the nodes. In this way, the fragment information corresponding to the same fragment identifier is clustered, a public user identifier of the nodes in the node group can be obtained. Therefore, a user identifier intersection set of the nodes in the node group can be obtained subsequently according to the public user identifier, and user data corresponding to the user identifier intersection set is aggregated as a training sample of a machine learning mode.

For example, it is assumed that the node group includes three first nodes, the second node may split a second user identifier SID1 to obtain three pieces of fragment information P11, P12, and P13, the three pieces of fragment information corresponding to a same fragment identifier P1. The second node may further split a second user identifier SID2 to obtain three pieces of fragment information P21, P22, and P23, the three pieces of fragment information corresponding to a same fragment identifier P2. The second node may further split a second user identifier SID3 to obtain three pieces of fragment information P31, P32, and P33, the three pieces of fragment information corresponding to a same fragment identifier P3. When fragment information maintained in the first nodes is aggregated to an aggregation node, the fragment information includes P11, P12, P13, P31, P32, and P23. Therefore, the fragment information is clustered and classified into three groups according to the fragment identifiers: (P11, P12, P13), (P31, P32), and (P23). The group of data (P11, P12, P13) includes three pieces of fragment information, and it indicates that SID1 from which P11, P12, and P13 originate is a user identifier shared by the nodes in the node group. The group of data (P31, P32) includes two pieces of fragment information, which are not aggregated, and it indicates that one first node has no user identifier from which P31 and P32 originate. The group of data (P23) includes one piece of fragment information, which is not aggregated, and it indicates that two first nodes have no user identifier from which P23 originates.

In the foregoing embodiments, encryption and decryption of private data are distributed to the nodes, fragment information is aggregated by using one first node, to finally obtain a complete intersection set. Complete information cannot be reversely deduced by using the fragment information, and only the fragment information that is successfully verified may be transmitted to the aggregation node. Therefore, each node cannot steal private data of another node by using own obtained information, to protect privacy of data in a non-intersection set.

In an embodiment, dimensions of user data in different nodes in the node group are different. The node group-based data processing method further includes: obtaining the user identifier intersection set of the nodes in the node group; locally querying user data corresponding to the public user identifier included in the user identifier intersection set; and transmitting the queried user data, the transmitted user data being used as the training sample of the machine learning model after being aggregated with user data transmitted by another node in the node group.

Dimensions of user data in different nodes in the node group are different. For example, a bank in a city has financial information of residents, and a hospital in the city has medical records of residents. Federated learning means that multiple participants cooperate to complete a training task of a machine learning model on the premise that data does not leave a database and data privacy is protected. During longitudinal federated learning, the participants have features of different dimensions of a sample of a same type, and a sample shared by the participants may be used as training data. An objective of the longitudinal federated learning is to aggregate the information to train a machine learning model and ensure that private data does not leave the database. To achieve this objective, sample alignment needs to be performed, that is, the participants provide user data belonging to a sample identifier intersection set for federated training (for example, which residents have registered both bank accounts and hospital medical records). The essence of the requirement is to perform private set intersection on sample identifiers of the participants.

Specifically, based on the foregoing embodiments, after the user identifier intersection set of the nodes in the node group is obtained, the user identifier intersection set may be notified to the user identifiers. Subsequently, when a node in the node group or a computer device outside the node group requires the nodes in the node group to provide user data, the nodes in the node group may locally query user data corresponding to the public user identifier included in the user identifier intersection set and transmit the queried user data to the node or the computer device requesting for data. The node or the computer device may aggregate and use the user data transmitted by the nodes in the node group as a training sample of a machine learning model.

Continuing to refer to FIG. 3, the nodes in the node group respectively store user data of different feature dimensions of a user. For example, the first node F1 (the participant 1) stores user data of a dimension of a first part, the first node F2 (the participant 2) stores user data of a dimension of a second part, and the second node S (the participant n) stores user data of a dimension of an $n^{th}$ part. After user identifiers of the nodes in the node group are processed by using the node group-based data processing method provided in this application, a user identifier intersection set of the nodes may be obtained, including user identifiers (sample IDs) 1, 11, and 20. Therefore, subsequently, when the user data is obtained from the nodes in the node group for federated learning, only user data corresponding to the user identifier intersection set of the nodes is obtained.

In this embodiment, after the user identifier intersection set of the nodes in the node group is obtained, user data of different feature dimensions of the nodes may be obtained based on the user identifier intersection set. The user data is used for training a machine learning model after being aligned, to protect privacy of data in a non-intersection set of the nodes.

In the foregoing embodiments, the user data corresponding to the user identifier intersection set is aggregated as the training sample of the machine learning model, which is only an example of an application scenario of a multi-party private set intersection. The multi-party private set intersection may further be applied to another scenario, for example, prediction of an actual effect of promotion content or finding contacts. The application scenario of the multi-party private set intersection is not limited in this application.

Figure 5:
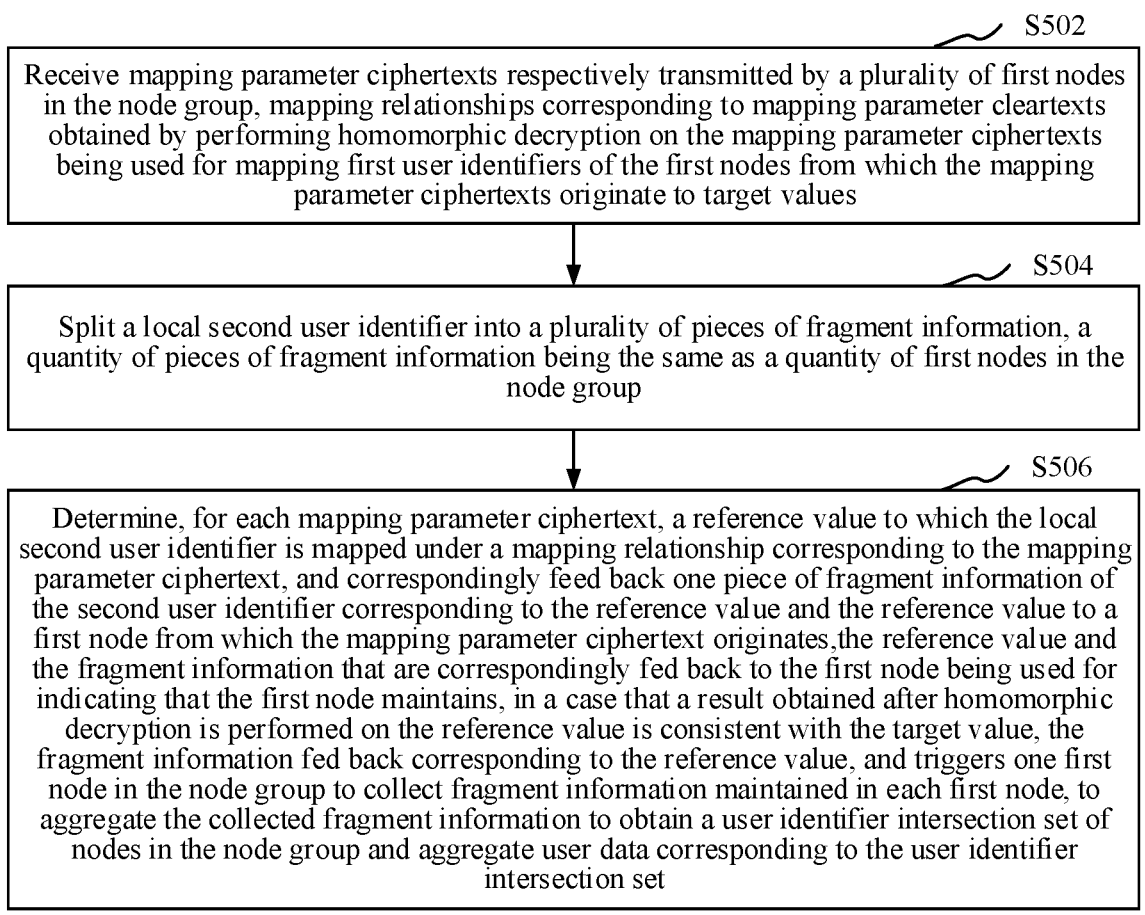
FIG. 5 is a schematic flowchart of a node group-based data processing method in another embodiment.

In an embodiment, as shown in FIG. 5, a node group-based data processing method is provided, and a description is made by using an example in which the method is applicable to the second node in the node group shown in FIG. 1. The method includes the following steps.

Step 502. Receive mapping parameter ciphertexts respectively transmitted by a plurality of first nodes in the node group, mapping relationships corresponding to mapping parameter cleartexts obtained by performing homomorphic decryption on the mapping parameter ciphertexts being used for mapping first user identifiers of the first nodes from which the mapping parameter ciphertexts originate to target values.

This embodiment is the technical solution executed by the second node according to the foregoing embodiments, and has the technical concept and technical features that correspond to the foregoing embodiments. In this embodiment and following embodiments, for the operation performed by the first node, reference may be made to the detailed descriptions in the foregoing embodiments, and for the operation performed by the second node, reference may also be made to the detailed descriptions in the foregoing embodiments. Certainly, in the foregoing embodiments, for the operation performed by the first node, reference may also be made to detailed descriptions in this embodiment and the following embodiments, and for the operation performed by the second node in the foregoing embodiments, reference may also be made to detailed descriptions in this embodiment and the following embodiments.

Step 504. Split a local second user identifier into a plurality of pieces of fragment information, a quantity of pieces of fragment information being the same as a quantity of first nodes in the node group.

Specifically, the second node may directly split a second user identifier into a plurality of pieces of fragment information or may process a second user identifier and then split a result of the processing into a plurality of pieces of fragment information. In addition, a quantity of pieces of fragment information obtained through splitting is the same as a quantity of first nodes in the node group. In this way, the fragment information of the second user identifier is distributed to each first node, and each first node cannot obtain a complete user identifier according to the fragment information. In addition, for a second user identifier, when and only when all the first nodes include the second user identifier, all fragment information of the second user identifier is maintained, that is, the second user identifier is a user identifier shared by the nodes in the node group, so that the user identifier may be allowed to be traced.

Step 506. Determine, for each mapping parameter ciphertext, a reference value to which the local second user identifier is mapped under a mapping relationship corresponding to the mapping parameter ciphertext, and correspondingly return one piece of fragment information of the second user identifier corresponding to the reference value and the reference value to a first node from which the mapping parameter ciphertext originates, the reference value and the fragment information that are correspondingly returned to the first node being used for indicating that the first node maintains, when a result obtained after homomorphic decryption is performed on the reference value is consistent with the target value, the fragment information returned corresponding to the reference value, and triggers one first node in the node group to collect fragment information maintained in each first node, to aggregate the collected fragment information to obtain a user identifier intersection set of nodes in the node group and aggregate user data corresponding to the user identifier intersection set.

Specifically, the second node may receive mapping parameter ciphertexts respectively transmitted by the first nodes, determine, for each mapping parameter ciphertext, a reference value to which the local second user identifier is mapped under a mapping relationship corresponding to the mapping parameter ciphertext, form a data pair by using one piece of fragment information of the second user identifier corresponding to the reference value and the reference value, and correspondingly return the data pair to a first node from which the mapping parameter ciphertext originates.

For example, it is assumed that the node group includes two first nodes F1 and F2 and a second node S. F1 constructs a mapping relationship Y1 according to a local first sample identifier, performs homomorphic encryption on a mapping parameter ym1 of Y1, to obtain ys1, and transfers ys1 to S. F2 constructs a mapping relationship Y2 according to a local first sample identifier, performs homomorphic encryption on a mapping parameter ym2 of Y2, to obtain ys2, and transfers ys2 to S. After receiving ys1 and ys2, S respectively determines reference values to which a local second user identifier is mapped under mapping relationships corresponding to ys1 and ys2. For example, for a second user identifier SID1, the second node may split SID1 to obtain two pieces of fragment information P11 and P12, determine a reference value C11 to which SID1 is mapped under the mapping relationship corresponding to ys1, and transmit C11 and P11 (or P12) as a data pair to F1; and determine a reference value C12 to which SID1 is mapped under the mapping relationship corresponding to ys2, and transmit C12 and P12 (or P11) as a data pair to F2. For a second user identifier SID2, the second node may split SID2 to obtain two pieces of fragment information P21 and P22, determine a reference value C21 to which SID2 is mapped under the mapping relationship corresponding to ys1, and transmit C21 and P21 (or P22) as a data pair to F1; and determine a reference value C22 to which SID2 is mapped under the mapping relationship corresponding to ys2, and transmit C22 and P22 (or P21) as a data pair to F2. The plurality of first nodes are not limited to simultaneously transmitting the mapping parameter ciphertexts to the second node. The second may respectively receive the mapping parameter ciphertexts. After receiving each mapping parameter ciphertext, the second node may perform subsequent processing without waiting for receiving mapping parameter ciphertexts transmitted by all the first node before performing the subsequent processing.

Subsequently, the first node may perform homomorphic decryption on the received reference value, compare a result of the homomorphic decryption with the target value, maintain, when the result is consistent with the target value, the fragment information returned corresponding to the reference value, and trigger one first node in the node group to collect fragment information maintained in each first node, to aggregate the collected fragment information to obtain a user identifier intersection set of nodes in the node group and aggregate user data corresponding to the user identifier intersection set.

Based on the node group-based data processing method, a first node in a node group constructs a mapping relationship according to a first user identifier, the mapping relationship being used for mapping the first user identifier to a target value. Therefore, after the first node performs homomorphic encryption on a mapping parameter of the mapping relationship to obtain a mapping parameter ciphertext and transfers the mapping parameter ciphertext to a second node in the node group, the second node may perform a homomorphic operation based on a local second user identifier under a ciphertext space, to obtain a reference value to which the second user identifier is mapped under a mapping relationship corresponding to the mapping parameter ciphertext, and then return one piece of fragment information of the second user identifier corresponding to the reference value and the reference value to the first node together. The first node maintains, when a result obtained after homomorphic decryption is performed on the reference value is consistent with the target value, the fragment information returned corresponding to the reference value, and triggers one first node in the node group to collect fragment information maintained in each first node, to aggregate the collected fragment information to obtain a user identifier intersection set of nodes in the node group and aggregate user data corresponding to the user identifier intersection set. Therefore, on one hand, because the first node transmits the mapping parameter ciphertext to the second node, the second node cannot reversely deduce the first user identifier of the first node through the ciphertext, and the homomorphic encryption provides a function of processing encrypted data, so that an operation may be performed on the ciphertext without obtaining a cleartext, and decryption is equivalent to performing a corresponding operation on a cleartext, to ensure a verification effect of the reference value and the target value of the first node. On the other hand, because a quantity of pieces of fragment information of each second user identifier is the same as a quantity of first nodes in the node group, the fragment information of each second user identifier is respectively returned to the first nodes, and the first node does not obtain a complete second user identifier of the second node. In addition to the finally obtained user identifier intersection set of the nodes in the node group, each node cannot steal privacy information of another node through own obtained information, thereby ensuring security of private data of the nodes without introducing a third party.

In an embodiment, the receiving mapping parameter ciphertexts respectively transmitted by a plurality of first nodes in the node group includes: receiving polynomial coefficient ciphertexts respectively transmitted by the plurality of first nodes in the node group, polynomials corresponding to polynomial coefficient cleartexts corresponding to the polynomial coefficient ciphertexts being used for mapping the first user identifiers of the first nodes from which the polynomial coefficient ciphertexts originate to a uniform target value, and the target value being zero. The determining, for each mapping parameter ciphertext, a reference value to which the local second user identifier is mapped under a mapping relationship corresponding to the mapping parameter ciphertext, and correspondingly feeding back one piece of fragment information of the second user identifier corresponding to the reference value and the reference value to a first node from which the mapping parameter ciphertext originates includes: calculating, for each of the polynomial coefficient ciphertexts, the reference value of the local second user identifier obtained by solving a polynomial corresponding to the polynomial coefficient ciphertext, and correspondingly feeding back the one piece of fragment information of the second user identifier corresponding to the reference value and the reference value to the first node from which the polynomial coefficient ciphertext originates.

Specifically, the second node may input a local second user identifier into the conversion function shared by the nodes in the node group, to obtain a converted intermediate value. Alternatively, the second node may offset a local second user identifier and then input the offset local second user identifier into the conversion function shared by the nodes in the node group, to obtain a converted intermediate value. An offset obtained by offsetting the second user identifier is an offset shared by the nodes in the node group. Subsequently, the second node calculates, for each of the polynomial coefficient ciphertexts, the reference value obtained by solving the intermediate value of the local second user identifier in a polynomial corresponding to the polynomial coefficient ciphertext, and correspondingly feeds back the one piece of fragment information of the second user identifier corresponding to the reference value and the reference value to the first node from which the polynomial coefficient ciphertext originates. The conversion function shared by the nodes in the node group is a function uniformly used by the nodes in the node group for converting user identifiers into natural numbers. The conversion function may be specifically a hash function or an encrypted hash function. The hash function may also be referred to as a hash function and may compress an input of any length as an output of a preset length, and the output stage is a hash value.

In this embodiment, the first node skillfully uses an intermediate value to which a user identifier is converted as a solution of a polynomial to construct a target polynomial, performs homomorphic encryption on a coefficient of the target polynomial, and transmits the encrypted coefficient to the second node. The second node performs calculation in a ciphertext space and feeds back a result to the first node. In this way, the first node compares a user identifier of the second node with the local user identifier without transferring a coefficient cleartext and leaking the local user identifier, to determine fragment information of a user identifier shared by the local and the second node.

In an embodiment, the splitting a local second user identifier into a pieces of fragment information includes: obtaining a conversion function shared by the nodes in the node group; converting the local second user identifier into the intermediate value by using the conversion function, so that same user identifiers of the nodes in the node group are converted into a same intermediate value; and splitting the intermediate value into a plurality of random numbers as the fragment information, a sum of the plurality of random numbers being the intermediate value, and a quantity of random numbers being the same as a quantity of first nodes in the node group.

Specifically, the second node may input a local second user identifier into the conversion function shared by the nodes in the node group, to obtain a converted intermediate value. Alternatively, the second node may offset a local second user identifier and then input the offset local second user identifier into the conversion function shared by the nodes in the node group, to obtain a converted intermediate value. Subsequently, the second node splits the intermediate value into a quantity of random numbers according to a quantity of first nodes in the node group, a sum of the plurality of random numbers being the intermediate value. Each random number is considered as one piece of fragment information of a second user identifier. In this way, when feeding back a reference value to the first node, the second node may combine the reference value and one random number as a data pair, which is beneficial to distributing the fragment information of the second user identifier to the first nodes in the node group. Subsequently, when all the first nodes in the node group have first user identifiers the same as the second user identifier, the fragment information of the second user identifier is aggregated into the aggregation node. The intermediate value to which the second user identifier is converted may be recovered by adding the fragment information, and then the second user identifier corresponding to the intermediate value is found, that is, a user identifier shared by the nodes in the node group.

For example, it is assumed that the node group includes three first nodes. A second node may receive mapping parameter ciphertexts ys1 (a first node F1), ys2 (a first node F2), and ys3 (a first node F3) respectively transmitted by the three first nodes. For a second user identifier SID1 of the second node, in an aspect, the second node may input SID1 into a conversion function H(x) shared by the nodes in the node group, to obtain an intermediate value H(SID1) obtained through conversion, and then split H(SID1) into a sum of three random numbers, that is, H(SID1)=P11+P12+P13. In an aspect, the second node respectively determines a reference value C11 to which SID1 is mapped under a mapping relationship corresponding to ys1, a reference value C12 to which SID1 is mapped under a mapping relationship corresponding to ys2, and a reference value C13 to which SID1 is mapped under a mapping relationship corresponding to ys3. Subsequently, the second node may form a data pair by using each reference value and one split random number and return the data pair to the first node from which the mapping parameter ciphertext corresponding to the reference value originates. For example, a data pair formed by C11 and P11 is returned to the first node F1, a data pair formed by C12 and P12 is returned to the first node F2, and a data pair formed by C13 and P13 is returned to the first node F3.

In this embodiment, the second node transmits only fragment information of a user identifier to another node, to protect privacy of data in a non-intersection set of the first node and the second node, thereby improving data security.

In an embodiment, the determining, for each mapping parameter ciphertext, a reference value to which the local second user identifier is mapped under a mapping relationship corresponding to the mapping parameter ciphertext, and correspondingly feeding back one piece of fragment information of the second user identifier corresponding to the reference value and the reference value to a first node from which the mapping parameter ciphertext originates includes: determining, for each mapping parameter ciphertext, a reference value to which the local second user identifier is mapped under the mapping relationship corresponding to the mapping parameter ciphertext, adding noise data to the reference value in a manner meeting a homomorphic encryption condition, and then correspondingly feeding back the one piece of fragment information of the second user identifier corresponding to the reference value and the reference value to the first node from which the mapping parameter ciphertext originates.

Specifically, the second node may first determine, for each mapping parameter ciphertext, a reference value to which the local second user identifier is mapped under a mapping relationship corresponding to the mapping parameter ciphertext, and then add noise data to the reference value in a manner meeting a homomorphic encryption condition. Subsequently, the second node may obtain one piece of fragment information of the second user identifier again, form a data pair by using the fragment information and the reference value to which the noise data is added, and return the data pair to the first node from which the mapping parameter ciphertext originates.

The adding the noise data to the reference value in the manner meeting the homomorphic encryption condition means that a result of homomorphic decryption before and after the noise data is added to the reference value does not change.

For example, it is assumed that the node group includes three first nodes. A second node may receive mapping parameter ciphertexts ys1 (a first node F1), ys2 (a first node F2), and ys3 (a first node F3) respectively transmitted by the three first nodes. For a second user identifier SID1 of the second node, the second node splits SID1 to obtain three pieces of fragment information P11, P12, and P13. The second node determines a reference value C11 to which SID1 is mapped under a mapping relationship corresponding to ys1, and then adds noise data to the reference value C11 in a manner meeting a homomorphic encryption condition, to obtain D11. The second node obtains the fragment information P11 obtained by splitting SID1, forms a data pair by using D11 and P11, and feeds back the data pair to the first node F1.

In a specific embodiment, the adding the noise data to the reference value in the manner meeting the homomorphic encryption condition specifically means that the reference value is multiplied by a random number under a homomorphic scalar multiplication operation. A function of adding the random number is to hide a non-zero result, so as to prevent the first node from reversely deducing, according to the reference value, a user identifier from which the reference value originates after the reference value is directly transmitted to the first node, thereby protecting privacy of data in a non-intersection set.

In this embodiment, the noise data is added to the reference value in the manner meeting the homomorphic encryption condition, and then the reference value to which the noise data is added is returned to the first node, to prevent the first node from reversely deducing, according to the reference value, a user identifier from which the reference value originates after the reference value is directly transmitted to the first node, thereby protecting privacy of data in a non-intersection set of the first node and the second node.

This application further provides a node group-based data processing system. A node group to which the system is applicable includes a plurality of first nodes and one second node. The first node is configured to construct a mapping relationship according to a first user identifier; and perform homomorphic encryption on a mapping parameter of the mapping relationship, to obtain a mapping parameter ciphertext, and transfer the mapping parameter ciphertext to the second node in the node group, the mapping relationship being used for mapping the first user identifier to a target value. The second node is configured to receive mapping parameter ciphertexts respectively transmitted by the plurality of first nodes in the node group; split a local second user identifier into a plurality of pieces of fragment information; and determine, for each mapping parameter ciphertext, a reference value to which the local second user identifier is mapped under a mapping relationship corresponding to the mapping parameter ciphertext, and correspondingly return one piece of fragment information of the second user identifier corresponding to the reference value and the reference value to a first node from which the mapping parameter ciphertext originates. The first node is further configured to receive the reference value and the fragment information that are correspondingly returned by the second node; and maintain, when a result obtained after homomorphic decryption is performed on the reference value is consistent with the target value, the fragment information returned corresponding to the reference value, and trigger one first node in the node group to collect fragment information maintained in each first node, to aggregate the collected fragment information to obtain a user identifier intersection set of nodes in the node group and aggregate user data corresponding to the user identifier intersection set.

In an embodiment, the first node is further configured to convert the first user identifier into an intermediate value; construct a target polynomial by using the intermediate value as a solution of a polynomial; and perform homomorphic encryption on a polynomial coefficient of the target polynomial, to obtain a polynomial coefficient ciphertext, and transfer the polynomial coefficient ciphertext to the second node in the node group, the target polynomial being used for mapping the first user identifier to a uniform target value, and the target value being zero. The second node is further configured to receive polynomial coefficient ciphertexts respectively transmitted by the plurality of first nodes in the node group; and calculate, for each of the polynomial coefficient ciphertexts, the reference value of the local second user identifier obtained by solving a polynomial corresponding to the polynomial coefficient ciphertext, and correspondingly return the one piece of fragment information of the second user identifier corresponding to the reference value and the reference value to the first node from which the polynomial coefficient ciphertext originates, polynomials corresponding to polynomial coefficient cleartexts corresponding to the polynomial coefficient ciphertexts being used for mapping the first user identifiers of the first nodes from which the polynomial coefficient ciphertexts originate to a uniform target value, and the target value being zero.

In another embodiment, the first node may be further configured to perform the steps performed by the first node in the foregoing embodiments, and the second node may be further configured to perform the steps performed by the second node in the foregoing embodiments.

This application further provides an application scenario. The node group-based data processing method and the node group-based data processing system are applied to the application scenario. Specifically, Application of the application scenario is as follows.

There are three roles in the scenario: (1) a plurality of main participants (first nodes), configured to convert local private data into polynomials; (2) a guest participant (a second node), configured to solve polynomials of the main participants based on local data and transmit results of the solution to the main participants; and (3) an aggregation participant: one main participant is selected from the main participants as the aggregation participant for performing aggregation to obtain a data intersection set of the participants. The participants participating multi-party private set intersection jointly follow a multi-party private set intersection protocol based on oblivious polynomial evaluation. Under the protocol, all the participants may obtain a multi-party private data intersection set and ensure that content in a non-intersection set is not leaked.

Figure 6:
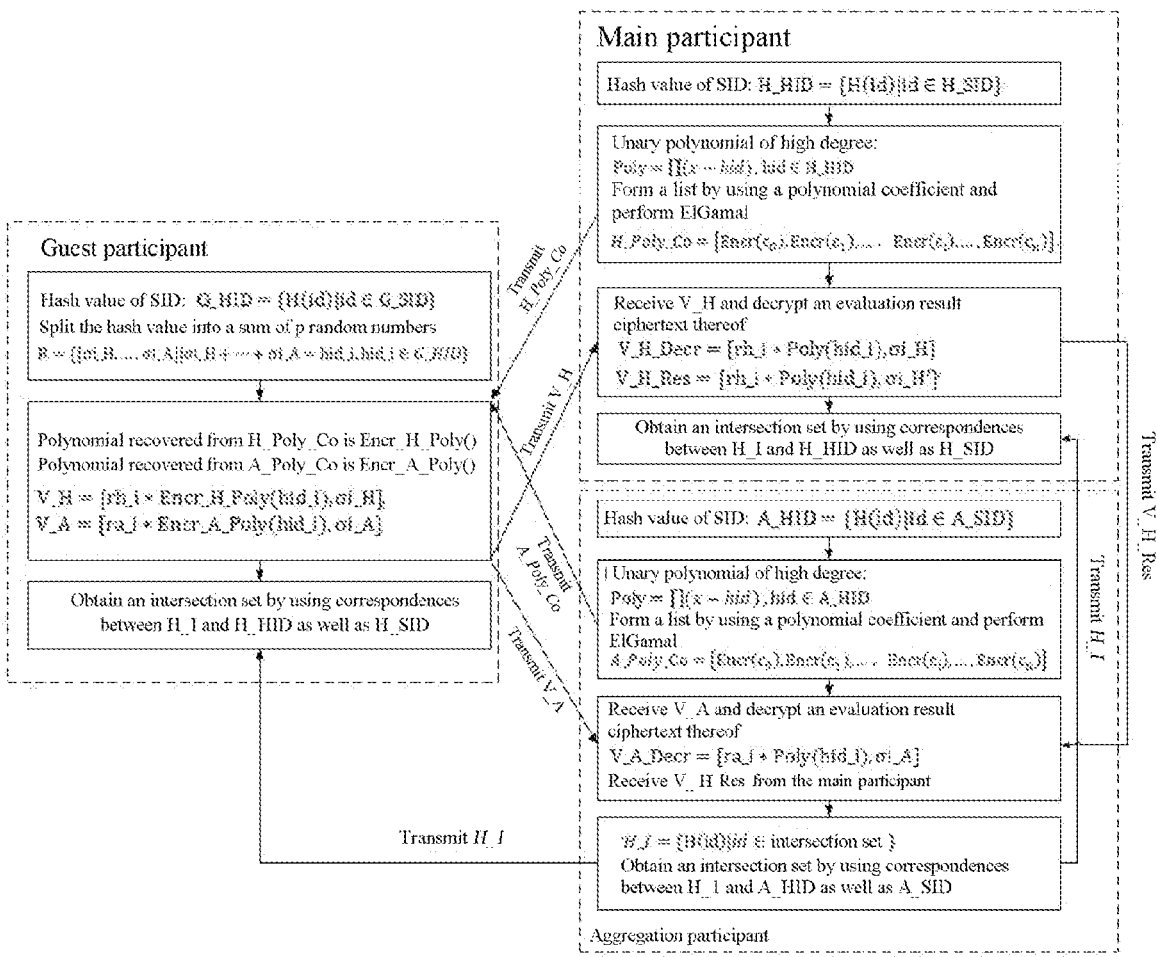
FIG. 6 is a diagram of a data flow direction of a node group-based data processing system in an embodiment.

Specifically, FIG. 6 is a diagram of a data flow direction of a node group-based data processing system in an embodiment. (1) Each main participant (the aggregation participant may be considered as a special main participant) generates an own public-private key pair PK and SK of an exponential ElGamal cryptosystem. The exponential ElGamal cryptosystem has a homomorphic operation function and may perform an operation on a ciphertext without obtaining a cleartext, and decryption is equivalent to performing an addition or scalar multiplication operation on a cleartext. The main participant maps local sample identifiers SIDs by using an encrypted hash function, to obtain hash values of SIDs, and then generates a unary polynomial of n degree by using the hash values as roots (n is a quantity of local sample identifiers SIDs). The polynomial is generated by using an operation of big integer without loss of accuracy. The main participant then expands the polynomial, encrypts a polynomial coefficient of an expansion by using PK, and then transmits the encrypted polynomial coefficient (a polynomial coefficient ciphertext) to a guest participant.

For example, for a main participant H, hash values of SIDs are H_HID={H(id)|id∈H_SID}, where H_HID is a hash value set obtained by mapping SIDs of the main participant H, H( ) is a hash function, and H_SID is an SID set of the main participant H.

A unary polynomial of high degree constructed by the main participant H is Poly=Π(x−hid), hid∈H_HID.

The encrypting the polynomial coefficient of the expansion of the polynomial by using PK may be specifically that a list is formed by using the polynomial coefficient, and ElGamal is performed, to obtain a polynomial coefficient ciphertext:

$$H\_Poly\_Co=[Encr(c_0), Encr(c_1), \ldots, Encr(c_i), \ldots, Encr(c_n)]$$

where $c_i$ is a coefficient of an $i^{th}$ item of the expansion, and Encr( ) is an encrypted function.

(2) A guest participant receives a polynomial coefficient ciphertext from each main participant and performs the following operations on each sample identifier SID of the guest participant:

(a) mapping SID by using an encrypted hash function, to obtain a hash value.

For example, for a guest participant G, hash values of SIDs are G_HID={H(id)|id∈G_SID}, where G_HID is a hash value set obtained by mapping SIDs of the guest participant G, H( ) is the hash function, and G_SID is an SID set of the guest participant.

(b) randomly splitting the hash value into a sum of p random numbers (p is a quantity of main participants).

$$R=\{[\sigma i\_H, \ldots, \sigma i\_A]|\sigma i\_H+ \ldots +\sigma i\_A=hid\_i, hid\_i \in G\_HID\}$$

where [σi_H, ..., σi_A]: is a list of p random numbers, and hid_i is hash values of SIDs of the guest participant.

(c) determining a new polynomial for each polynomial coefficient ciphertext and performing the following operations: substituting the hash value into the new polynomial through homomorphic encryption for evaluation, and multiplying a result of the evaluation by a random number (a random number obtained by a non-split hash value) under a homomorphic scalar multiplication operation. An effect of adding the random number is to hide a non-zero result, to protect privacy of data in a non-intersection set. Because an ElGamal encryption process has randomness (results obtained by encrypting a same cleartext for several times are different), the guest participant cannot deduce whether a result of evaluation on the cleartext is 0 by comparing with a result of evaluation on a ciphertext. For the polynomial coefficient ciphertext, a data pair is formed by using the result of the evaluation and one of the random numbers obtained through splitting in (b), and the data pair is transmitted to the main participant from which the polynomial coefficient ciphertext originates.

For example, the polynomial coefficient ciphertext transmitted by the main participant H is H_Poly_Co, and a polynomial (a ciphertext space of homomorphic encryption) recovered from H_Poly_Co is Encr_H_Poly( ) The guest participant substitutes a local hash value into Encr_H_Poly( ) for evaluation, to obtain a result of the evaluation Encr_H_Poly(hid_i), and multiplies the result of the evaluation by one random number under a homomorphic scalar multiplication operation: rh_i*Encr_H_Poly(hid_i), rh_i being the random number. The guest participant forms a data pair V_H=[rh_i*Encr_H_Poly(hid_i), σi_H] by using rh_i*Encr_H_Poly(hid_i) and one random number σi_H obtained by splitting the hash value, and feeds back the data pair to the main participant H.

In another example, a polynomial coefficient ciphertext transmitted by a main participant A is A_Poly_Co, and a polynomial (a ciphertext space of homomorphic encryption) recovered from A_Poly_Co is Encr_A_Poly( ) The guest participant substitutes a local hash value into Encr_A_Poly( ) for evaluation, to obtain a result of the evaluation Encr_A_Poly(hid_i), and multiplies the result of the evaluation by one random number under a homomorphic scalar multiplication operation: rh_i*Encr_A_Poly(hid_i), rh_i being the random number. The guest participant forms a data pair V_A=[rh_i*Encr_A_Poly(hid_i), σi_H] by using rh_i*Encr_A_Poly(hid_i) and one random number σi_H obtained by splitting the hash value, and feeds back the data pair to the main participant A.

(3) The main participant receives a data pair returned by the guest participant, the data pair including a result of evaluation on a ciphertext of SID of the guest participant in a local polynomial and fragment information of SID of the guest participant. The main participant decrypts the result of the evaluation on the ciphertext by using SK. If a decryption result is 0, the fragment information is maintained, otherwise, the fragment information is set to 0. The main participant transmits a verification result cleartext and the fragment information to the aggregation participant.

For example, after receiving the data pair V_H= [rh_i*Encr_H_Poly(hid_i), σi_H], the main participant H decrypts rh_i*Encr_H_Poly(hid_i) in the data pair by using SK, to obtain a decrypted data pair V_H_Decr=[rh_i*Poly(hid_i), σi_H]. If rh_i*Poly(hid_i) is 0, fragment information σi_H is maintained, otherwise, the fragment information σi_H is set to 0, to obtain V_H_Res=[rh_i*Poly(hid_i), σi_H'] and transmit V_H_Res=[rh_i*Poly(hid_i), σi_H'] to the aggregation participant. If rh_i*Poly(hid_i) is 0, σi_H'=σi_H; otherwise, σi_H'=0.

(4) The aggregation participant receives verification results and fragment information of all SIDs of the guest participant in all the main participants, and if the verification results in all the main participants are 0, the fragment information is added to obtain a hash value of an SID intersection set. The hash value of the SID intersection set is transmitted to the guest participant and another main participant.

It is assumed that the main participant A is selected as the aggregation participant, for the aggregation participant A, hash values of SIDs are A_HID={H(id)|id∈A_SID}, where A_HID is a hash value set obtained by mapping SIDs of the aggregation participant A, H( ) is the hash function, and A_SID is an SID set of the aggregation participant A.

A unary polynomial of high degree constructed by the aggregation participant A is Poly=Π(x−hid), hid∈A_HID.

The encrypting the polynomial coefficient of the expansion of the polynomial by using PK may be specifically that a list is formed by using the polynomial coefficient, and ElGamal is performed, to obtain a polynomial coefficient ciphertext:

$A\_Poly\_Co=[Encr(c_0), Encr(c_1), \ldots, Encr(c_i), \ldots Encr(c_n)]$ where $c_1$ is a coefficient of an $i^{th}$ item of the expansion, and Encr( ) is an encrypted function.

After receiving the data pair V_A=[rh_i*Encr_A_Poly(hid_i), σi_A], the main participant A decrypts rh_i*Encr_A_Poly(hid_i) in the data pair by using SK, to obtain a decrypted data pair V_A_Decr=[rh_i*Poly(hid_i), σi_A]. If ra_i*Poly(hid_i) is 0, fragment information σi_A is maintained; otherwise, the fragment information σi_A is set to 0.

The aggregation participant further receives a verification result and fragment information transmitted by another main participant, for example, $V_{H_{Res}}$=[rh_i*Poly(hid_j), σi_H'] transmitted by the main participant H. Then, with reference to local information, a hash value set H_I={H(id)|id∈ an intersection set) of the SID intersection set is transmitted to the guest participant and another main participant.

(5) Each participant obtains the hash value of the SID intersection set, compares the hash value in a mapping table between local SIDs and hash values, a mapping source of the hash value being SID, to finally obtain an SID intersection set of the participants.

For example, the main participant H obtains an SID intersection set by using correspondences between H_1 and H_HID as well as H_SID, the guest participant G obtains an SID intersection set by using correspondences between H_I and G_HID as well as G_SID, and the aggregation participant A obtains an SID intersection set by using correspondences between H_I and A_HID as well as A_SID.

In this way, in this embodiment, the encrypted hash function, noise confusion, homomorphic encryption, and oblivious polynomial evaluation are combined to implement multiple information protection of multi-party private data. The encryption and decryption of a private data intersection set are distributed to the participants: the main participant converts private data to roots of a unary polynomial of high degree for hiding and provides an encrypted hash function and protection of homomorphic encryption. The guest participant performs a polynomial evaluation through homomorphic encryption in a ciphertext space, hides a non-zero result by using artificial noise, randomly splits private data, and respectively transmits fragment information and a result of the polynomial evaluation to a corresponding main participant. The main participant decrypts the result of the polynomial evaluation and performs root verification, and transmits the fragment information that is successfully verified to one main participant (or referred to as an aggregation participant). The aggregation participant aggregates the fragment information in the intersection set that is successfully verified by the main participant, and finally obtains a complete intersection set. Complete information cannot be reversely deduced by using the fragment information, and only the fragment information that is successfully verified may be transmitted to the aggregation participant. Therefore, each participant cannot steal private data of another participant by using own obtained information. Only through cooperation of multiple parties, cleartext data in an intersection set can be obtained, which ensures that private set intersection can be implemented without introducing a trustable third party, and an intersection set of any two parties is not leaked. In addition, according to the embodiments of this application, the participants of a longitudinal federated learning sample alignment algorithm may be expanded from two parties to multiple parties, to expand an application scenario of the longitudinal federated learning, thereby improving usability.

Figure 7:
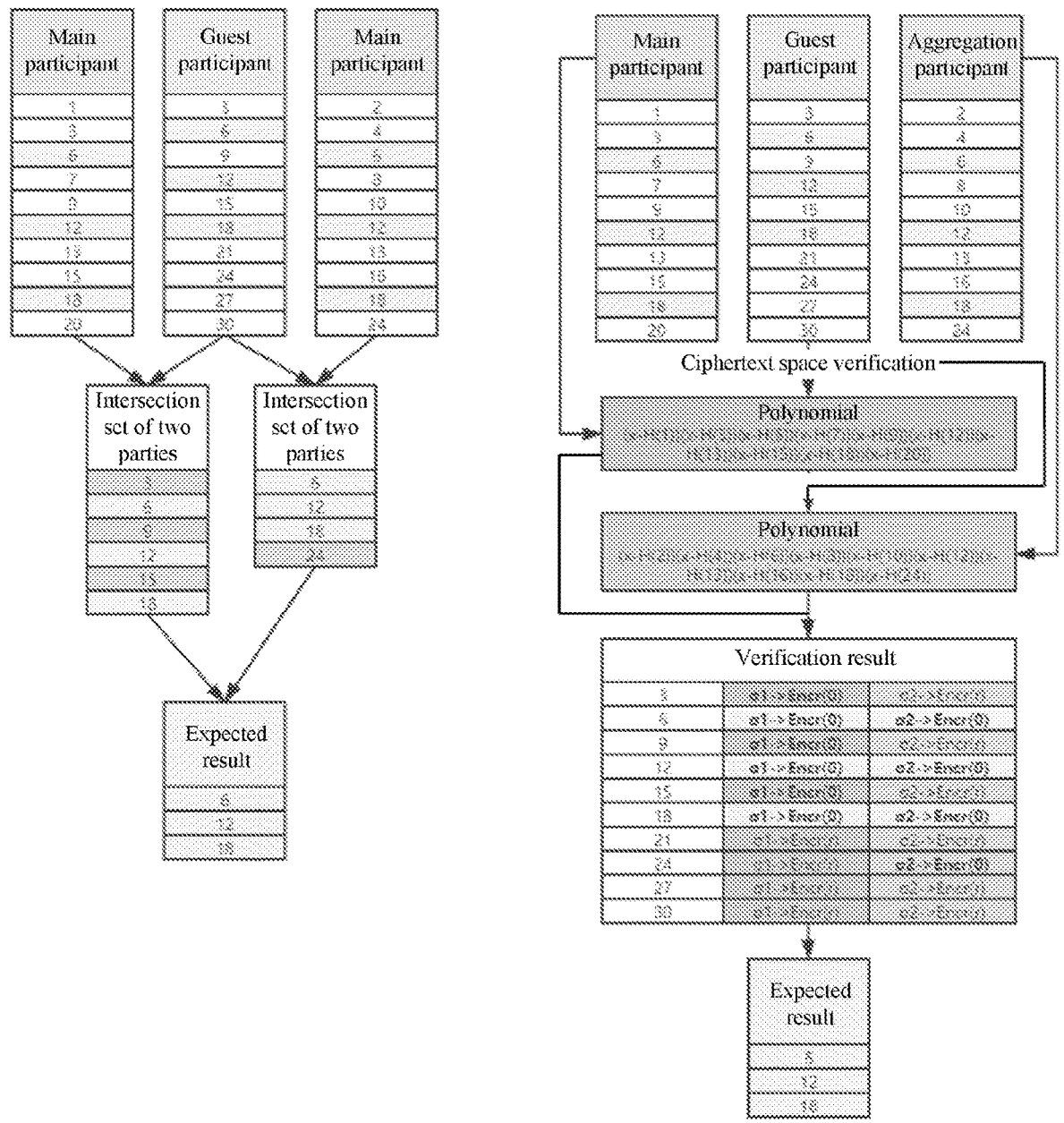
FIG. 7 is a schematic diagram of data change in node group-based data processing in an embodiment.

FIG. 7 is a schematic diagram of data change in node group-based data processing in an embodiment. Referring to the figure, a left side in the figure is an existing data processing technical solution. It can be learned that a process of obtaining an intersection set of three parties is to first obtain intersection sets of two parties of main participants and a guest participant, and then obtain the intersection set of the three parties according to the intersection sets of the two parties, which leaks the intersection set of two parties. A right side in the figure is a data processing technical solution provided in this application. It can be learned that main participants construct polynomials by using hash values of local SIDs as roots, a guest participant performs polynomial evaluation in a ciphertext space by using hash values of local SIDs to obtain an evaluation ciphertext, and the main participants perform verification to obtain verification results after decrypting the evaluation ciphertext and then directly obtain an intersection set of three parties based on the verification results. In this case, only the intersection set of the three parties is presented in a form of cleartext, to improve security of multi-party private data.

A polynomial constructed by one main participant is as follows:

$$(x-H(1))(x-H(3))(x-H(6))(x-(7))(x-H(9))(x-H(12))$$
$$(x-H(13))(x-H(15))(x-H(18))(x-H(20))$$

A polynomial constructed by another main participant (an aggregation participant) is as follows:

$$(x-H(2))(x-H(4))(x-H(6))(x-H(8))(x-H(10))(x-H(12))(x-H(13))(x-H(16))(x-H(18))(x-H(24))$$

The verification results obtained by verifying SIDs of the guest participant based on the polynomials are:

| 3  | σ1 → Encr(0) | σ2 → Encr(r) |
|----|--------------|--------------|
| 6  | σ1 → Encr(0) | σ2 → Encr(0) |
| 9  | σ1 → Encr(0) | σ2 → Encr(r) |
| 12 | σ1 → Encr(0) | σ2 → Encr(0) |
| 15 | σ1 → Encr(0) | σ2 → Encr(r) |
| 18 | σ1 → Encr(0) | σ2 → Encr(0) |
| 21 | σ1 → Encr(r) | σ2 → Encr(r) |
| 24 | σ1 → Encr(r) | σ2 → Encr(0) |
| 27 | σ1 → Encr(r) | σ2 → Encr(r) |
| 30 | σ1 → Encr(r) | σ2 → Encr(r) | a→b represents a key-value pair. For example, σ1→Encr(0) represents that a ciphertext of a verification result σ1 is Encr(0), a cleartext is 0, and it indicates that SID=3 is an SID shared by the main participants and the guest participant. In another example, σ2→Encr(r) represents that a ciphertext of a verification result σ2 is Encr(r), a cleartext is r, and it indicates that SID=3 is not the SID shared by the main participants and the guest participant. The finally obtained intersection set of three parties includes: 6, 12, 18.

Although the steps in the flowcharts of the embodiments are displayed sequentially according to instructions of arrows, these steps are not necessarily performed sequentially according to a sequence instructed by the arrows. Unless otherwise explicitly specified in this application, execution of the steps is not strictly limited, and the steps may be performed in other sequences. In addition, at least some steps in the flowcharts of the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 8:
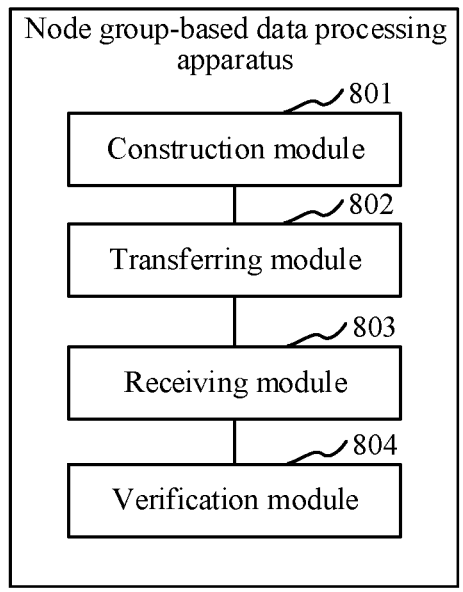
FIG. 8 is a structural block diagram of a node group-based data processing apparatus in an embodiment.

In an embodiment, as shown in FIG. 8, a node group-based data processing apparatus is provided, applicable to one first node in a node group. The apparatus may be implemented as a part of a computer device by using a software module or a hardware module or a combination thereof. The apparatus specifically includes: a construction module 801, a transferring module 802, a receiving module 803, and a verification module 804.

The construction module 801 is configured to construct a mapping relationship according to a first user identifier, the mapping relationship being used for mapping the first user identifier to a target value.

The transferring module 802 is configured to perform homomorphic encryption on a mapping parameter of the mapping relationship, to obtain a mapping parameter ciphertext, and transfer the mapping parameter ciphertext to a second node in the node group, the mapping parameter ciphertext being used for instructing the second node to determine a reference value to which a second user identifier of the second node is mapped under a mapping relationship corresponding to the mapping parameter ciphertext and correspondingly return one piece of fragment information of the second user identifier corresponding to the reference value and the reference value to the first node, a quantity of pieces of fragment information of each second user identifier being the same as a quantity of first nodes in the node group, so that each piece of fragment information is returned to each first node.

The receiving module 803 is configured to receive the reference value and the fragment information that are correspondingly returned by the second node.

The verification module 804 is configured to maintain, when a result obtained after homomorphic decryption is performed on the reference value is consistent with the target value, the fragment information returned corresponding to the reference value, and trigger one first node in the node group to collect fragment information maintained in each first node, to aggregate the collected fragment information to obtain a user identifier intersection set of nodes in the node group and aggregate user data corresponding to the user identifier intersection set.

In an embodiment, the construction module 801 is further configured to convert the first user identifier into an intermediate value; and construct a target polynomial by using the intermediate value as a solution of a polynomial, the target polynomial being used for mapping the first user identifier to a uniform target value, and the target value being zero. The transferring module 802 is further configured to perform homomorphic encryption on a polynomial coefficient of the target polynomial, to obtain a polynomial coefficient ciphertext, and transfer the polynomial coefficient ciphertext to the second node in the node group.

In an embodiment, the construction module 801 is further configured to obtain a conversion function shared by the nodes in the node group; and convert the first user identifier into the intermediate value by using the conversion function, so that same user identifiers of the nodes in the node group are converted into a same intermediate value.

In an embodiment, the transferring module 802 is further configured to obtain a local key pair generated in a homomorphic encryption manner, the key pair including a public key and a private key; and perform homomorphic encryption on the mapping parameter of the mapping relationship by using the public key, to obtain the mapping parameter ciphertext, and transfer the mapping parameter ciphertext to the second node in the node group. The verification module 804 is further configured to maintain, when the result obtained after homomorphic decryption is performed on the reference value by using the private key is consistent with the target value, the fragment information returned corresponding to the reference value, and trigger one first node in the node group to collect fragment information maintained in each first node, to aggregate the collected fragment information to obtain the user identifier intersection set of the nodes in the node group and aggregate the user data corresponding to the user identifier intersection set.

In an embodiment, the verification module 804 is further configured to perform homomorphic decryption on the reference value to obtain a decryption result; and maintain, when the decryption result is consistent with the target value, the fragment information returned corresponding to the reference value, and correspondingly transfer the maintained fragment information and the decryption result indicating that verification succeeds to an aggregation node, the transferred fragment information being used for being aggregated in the aggregation node to obtain the user identifier intersection set of the nodes in the node group, so as to aggregate the user data corresponding to the user identifier intersection set as a training sample of a machine learning model, and the aggregation node being one first node in the node group.

Figure 9:
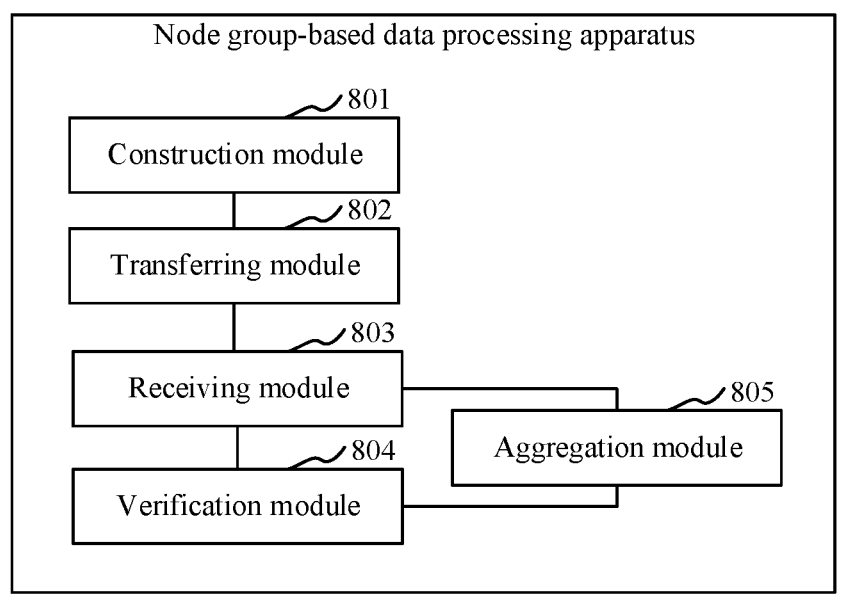
FIG. 9 is a structural block diagram of a node group-based data processing apparatus in another embodiment.

In an embodiment, as shown in FIG. 9, the node group-based data processing apparatus further includes an aggregation module 805.

The verification module 804 is further configured to maintain, when a result obtained after homomorphic decryption is performed on the reference value is consistent with the target value, the fragment information returned corresponding to the reference value.

The receiving module 803 is further configured to receive maintained fragment information transmitted by another first node in the node group.

The aggregation module 805 is configured to aggregate, when a quantity of pieces of fragment information corresponding to a same fragment identifier reaches the quantity of first nodes, the fragment information corresponding to the same fragment identifier, to obtain a public user identifier of the nodes in the node group; and obtain the user identifier intersection set of the nodes in the node group according to the public user identifier, to aggregate the user data corresponding to the user identifier intersection set as a training sample of a machine learning mode.

In an embodiment, dimensions of user data in different nodes in the node group are different. The aggregation module 805 is further configured to obtain the user identifier intersection set of the nodes in the node group; locally query user data corresponding to the public user identifier included in the user identifier intersection set; and transmit the queried user data, the transmitted user data being used as the training sample of the machine learning model after being aggregated with user data transmitted by another node in the node group.

Figure 10:
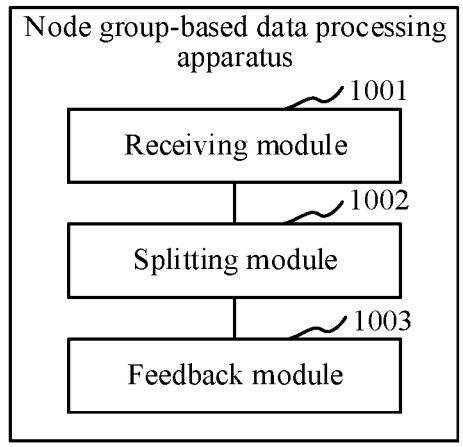
FIG. 10 is a structural block diagram of a node group-based data processing apparatus in another embodiment.

In an embodiment, as shown in FIG. 10, a node group-based data processing apparatus is provided, applicable to a second node in the node group. The apparatus may be implemented as a part of a computer device by using a software module or a hardware module or a combination thereof. The apparatus specifically includes: a receiving module 1001, a splitting module 1002, and a feedback module 1003.

The receiving module 1001 is configured to receive mapping parameter ciphertexts respectively transmitted by a plurality of first nodes in the node group, mapping relationships corresponding to mapping parameter cleartexts obtained by performing homomorphic decryption on the mapping parameter ciphertexts being used for mapping first user identifiers of the first nodes from which the mapping parameter ciphertexts originate to target values.

The splitting module 1002 is configured to split a local second user identifier into a plurality of pieces of fragment information, a quantity of pieces of fragment information being the same as a quantity of first nodes in the node group.

The feedback module 1003 is configured to determine, for each mapping parameter ciphertext, a reference value to which the local second user identifier is mapped under a mapping relationship corresponding to the mapping parameter ciphertext, and correspondingly return one piece of fragment information of the second user identifier corresponding to the reference value and the reference value to a first node from which the mapping parameter ciphertext originates, the reference value and the fragment information that are correspondingly returned to the first node being used for indicating that the first node maintains, when a result obtained after homomorphic decryption is performed on the reference value is consistent with the target value, the fragment information returned corresponding to the reference value, and triggers one first node in the node group to collect fragment information maintained in each first node, to aggregate the collected fragment information to obtain a user identifier intersection set of nodes in the node group and aggregate user data corresponding to the user identifier intersection set.

In an embodiment, the receiving module 1001 is further configured to receive polynomial coefficient ciphertexts respectively transmitted by the plurality of first nodes in the node group, polynomials corresponding to polynomial coefficient cleartexts corresponding to the polynomial coefficient ciphertexts being used for mapping the first user identifiers of the first nodes from which the polynomial coefficient ciphertexts originate to a uniform target value, and the target value being zero. The feedback module 1003 is further configured to calculate, for each of the polynomial coefficient ciphertexts, the reference value of the local second user identifier obtained by solving a polynomial corresponding to the polynomial coefficient ciphertext, and correspondingly return the one piece of fragment information of the second user identifier corresponding to the reference value and the reference value to the first node from which the polynomial coefficient ciphertext originates.

In an embodiment, the splitting module 1002 is further configured to obtain a conversion function shared by the nodes in the node group; convert the local second user identifier into the intermediate value by using the conversion function, so that same user identifiers of the nodes in the node group are converted into a same intermediate value; and split the intermediate value into a plurality of random numbers as the fragment information, a sum of the plurality of random numbers being the intermediate value, and a quantity of random numbers being the same as a quantity of first nodes in the node group.

In an embodiment, the feedback module 1003 is further configured to determine, for each mapping parameter ciphertext, a reference value to which the local second user identifier is mapped under the mapping relationship corresponding to the mapping parameter ciphertext, add noise data to the reference value in a manner meeting a homomorphic encryption condition, and then correspondingly return the one piece of fragment information of the second user identifier corresponding to the reference value and the reference value to the first node from which the mapping parameter ciphertext originates.

Based on the node group-based data processing apparatus, a first node in a node group constructs a mapping relationship according to a first user identifier, the mapping relationship being used for mapping the first user identifier to a target value. Therefore, after the first node performs homomorphic encryption on a mapping parameter of the mapping relationship to obtain a mapping parameter ciphertext and transfers the mapping parameter ciphertext to a second node in the node group, the second node may perform a homomorphic operation based on a local second user identifier under a ciphertext space, to obtain a reference value to which the second user identifier is mapped under a mapping relationship corresponding to the mapping parameter ciphertext, and then return one piece of fragment information of the second user identifier corresponding to the reference value and the reference value to the first node together. The first node maintains, when a result obtained after homomorphic decryption is performed on the reference value is consistent with the target value, the fragment information returned corresponding to the reference value, and triggers one first node in the node group to collect fragment information maintained in each first node, to aggregate the collected fragment information to obtain a user identifier intersection set of nodes in the node group and aggregate user data corresponding to the user identifier intersection set. Therefore, on one hand, because the first node transmits the mapping parameter ciphertext to the second node, the second node cannot reversely deduce the first user identifier of the first node through the ciphertext, and the homomorphic encryption provides a function of processing encrypted data, so that an operation may be performed on the ciphertext without obtaining a cleartext, and decryption is equivalent to performing a corresponding operation on a cleartext, to ensure a verification effect of the reference value and the target value of the first node. On the other hand, because a quantity of pieces of fragment information of each second user identifier is the same as a quantity of first nodes in the node group, the fragment information of each second user identifier is respectively returned to the first nodes, and the first node does not obtain a complete second user identifier of the second node. In addition to the finally obtained user identifier intersection set of the nodes in the node group, each node cannot steal privacy information of another node through own obtained information, thereby ensuring security of private data of the nodes without introducing a third party.

For a specific limitation on the node group-based data processing apparatus, reference is made to the limitation on the node group-based data processing method above, and details are not described herein again. The modules in the foregoing node group-based data processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 11. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store node group-based data processing data. The network interface of the computer device is configured to communicate with an external terminal through a network connection. The computer-readable instructions are executed by the processor to implement a node group-based data processing method.

Figure 11:
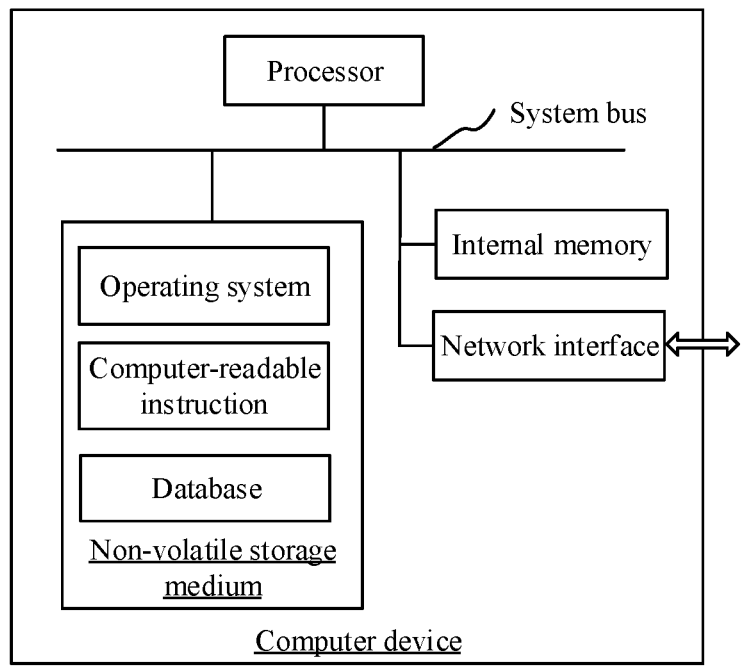
FIG. 11 is a diagram of an internal structure of a computer device in an embodiment.

A person skilled in the art may understand that, the structure shown in FIG. 11 is only a block diagram of a part of a structure correlated to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments.

In an embodiment, a computer program product or a computer program is provided. The computer program product or the computer program comprises computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be comprised. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A node group-based data processing method performed by a node group, the node group including a plurality of first nodes and a second node in the node group, wherein one of the plurality of first nodes is designated as an aggregation node, the method comprising:
   constructing, by each of the first nodes, a mapping relationship according to a first user identifier of the first node, the mapping relationship being used for mapping the first user identifier to a target value;
   performing, by each of the first nodes, homomorphic encryption on a mapping parameter of the mapping relationship, to obtain a mapping parameter ciphertext, and transferring the mapping parameter ciphertext to the second node in the node group;
   determining, by the second node, a reference value to which a second user identifier of the second node is mapped under a mapping relationship corresponding to the mapping parameter ciphertext and correspondingly returning one piece of fragment information of the second user identifier corresponding to the reference value to a corresponding one of the plurality of first nodes, wherein a quantity of pieces of fragment information of the second user identifier is the same as a quantity of first nodes in the node group;
   receiving, by each of the first nodes, the reference value and the fragment information that are correspondingly returned by the second node;
   maintaining, by each of the first nodes, when a result obtained after homomorphic decryption is performed on the reference value is consistent with the target value, the fragment information returned corresponding to the reference value, and triggering the aggregation node to collect fragment information maintained in each node in the node group; and
   aggregating, by the aggregation node, the collected fragment information to obtain a user identifier intersection set of nodes in the node group and aggregating user data corresponding to the user identifier intersection set.

2. The method according to claim 1, wherein the constructing, by each of the first nodes, a mapping relationship according to a first user identifier comprises:
   converting the first user identifier into an intermediate value; and
   constructing a target polynomial by using the intermediate value as a solution of a polynomial, the target polynomial being used for mapping the first user identifier to a uniform target value; and
   the performing, by each of the first nodes, homomorphic encryption on a mapping parameter of the mapping relationship, to obtain a mapping parameter ciphertext, and transferring the mapping parameter ciphertext to the second node in the node group comprises:
   performing homomorphic encryption on a polynomial coefficient of the target polynomial, to obtain a polynomial coefficient ciphertext, and transferring the polynomial coefficient ciphertext to the second node in the node group.

3. The method according to claim 2, wherein the converting the first user identifier into an intermediate value comprises:
   obtaining a conversion function shared by the nodes in the node group; and
   converting the first user identifier into the intermediate value by using the conversion function, so that same user identifiers between the nodes in the node group are converted into a same intermediate value.

4. The method according to claim 1, wherein the performing, by each of the first nodes, homomorphic encryption on a mapping parameter of the mapping relationship, to obtain a mapping parameter ciphertext, and transferring the mapping parameter ciphertext to the second node in the node group comprises:
   obtaining a local key pair generated in a homomorphic encryption manner, the key pair comprising a public key and a private key; and
   performing homomorphic encryption on the mapping parameter of the mapping relationship by using the public key, to obtain the mapping parameter ciphertext, and transferring the mapping parameter ciphertext to the second node in the node group.

5. The method according to claim 1, wherein fragment information belonging to a same second user identifier corresponds to a same fragment identifier;
   the aggregating, by the aggregation node, the collected fragment information to obtain a user identifier intersection set of nodes in the node group and aggregating user data corresponding to the user identifier intersection set comprises:
   receiving maintained fragment information transmitted by another first node in the node group;
   aggregating the fragment information corresponding to the same fragment identifier, to obtain a public user identifier of the nodes in the node group; and
   obtaining the user identifier intersection set of the nodes in the node group according to the public user identifier, to aggregate the user data corresponding to the user identifier intersection set as a training sample of a machine learning mode.

6. The method according to claim 1, wherein dimensions of the user data in different nodes in the node group are different; and the method further comprises:
   obtaining the user identifier intersection set of the different nodes in the node group;
   locally querying user data corresponding to a public user identifier comprised in the user identifier intersection set; and
   transmitting the queried user data, the transmitted user data being used as a training sample of a machine learning model after being aggregated with the user data transmitted by another node in the node group.

7. A node group including a plurality of first nodes and a second node, wherein one of the plurality of first nodes is designated as an aggregation node, each node corresponding to a computer device, comprising a memory and a processor, the memory storing computer-readable instructions that, when executed by the processor, cause the computer device to implement a node group-based data processing method including:
   constructing, by each of the first nodes, a mapping relationship according to a first user identifier of the first node, the mapping relationship being used for mapping the first user identifier to a target value;
   performing, by each of the first nodes, homomorphic encryption on a mapping parameter of the mapping relationship, to obtain a mapping parameter ciphertext, and transferring the mapping parameter ciphertext to the second node in the node group;
   determining, by the second node, a reference value to which a second user identifier of the second node is mapped under a mapping relationship corresponding to the mapping parameter ciphertext and correspondingly returning one piece of fragment information of the second user identifier corresponding to the reference value and the reference value to a corresponding one of the plurality of first nodes, wherein a quantity of pieces of fragment information of the second user identifier is the same as a quantity of first nodes in the node group;

receiving, by each of the first nodes, the reference value and the fragment information that are correspondingly returned by the second node;

maintaining, by each of the first nodes, when a result obtained after homomorphic decryption is performed on the reference value is consistent with the target value, the fragment information returned corresponding to the reference value, and triggering the aggregation node to collect fragment information maintained in each node in the node group; and aggregating, by the aggregation node, the collected fragment information to obtain a user identifier intersection set of nodes in the node group and aggregating user data corresponding to the user identifier intersection set.

8. The computer device according to claim 7, wherein the constructing, by each of the first nodes, a mapping relationship according to a first user identifier comprises:

converting the first user identifier into an intermediate value; and constructing a target polynomial by using the intermediate value as a solution of a polynomial, the target polynomial being used for mapping the first user identifier to a uniform target value; and the performing, by each of the first nodes, homomorphic encryption on a mapping parameter of the mapping relationship, to obtain a mapping parameter ciphertext, and transferring the mapping parameter ciphertext to the second node in the node group comprises:

performing homomorphic encryption on a polynomial coefficient of the target polynomial, to obtain a polynomial coefficient ciphertext, and transferring the polynomial coefficient ciphertext to the second node in the node group.

9. The computer device according to claim 8, wherein the converting the first user identifier into an intermediate value comprises:

obtaining a conversion function shared by the nodes in the node group; and converting the first user identifier into the intermediate value by using the conversion function, so that same user identifiers between the nodes in the node group are converted into a same intermediate value.

10. The computer device according to claim 7, wherein the performing, by each of the first nodes, homomorphic encryption on a mapping parameter of the mapping relationship, to obtain a mapping parameter ciphertext, and transferring the mapping parameter ciphertext to the second node in the node group comprises:

obtaining a local key pair generated in a homomorphic encryption manner, the key pair comprising a public key and a private key; and performing homomorphic encryption on the mapping parameter of the mapping relationship by using the public key, to obtain the mapping parameter ciphertext, and transferring the mapping parameter ciphertext to the second node in the node group.

11. The computer device according to claim 7, wherein fragment information belonging to a same second user identifier corresponds to a same fragment identifier;

the aggregating, by the aggregation node, the collected fragment information to obtain a user identifier intersection set of nodes in the node group and aggregating user data corresponding to the user identifier intersection set comprises:

receiving maintained fragment information transmitted by another first node in the node group;

aggregating the fragment information corresponding to the same fragment identifier, to obtain a public user identifier of the nodes in the node group; and obtaining the user identifier intersection set of the nodes in the node group according to the public user identifier, to aggregate the user data corresponding to the user identifier intersection set as a training sample of a machine learning mode.

12. The computer device according to claim 7, wherein dimensions of the user data in different nodes in the node group are different; and the method further comprises:

obtaining the user identifier intersection set of the different nodes in the node group;

locally querying user data corresponding to a public user identifier comprised in the user identifier intersection set; and transmitting the queried user data, the transmitted user data being used as the training sample of a machine learning model after being aggregated with the user data transmitted by another node in the node group.

13. A non-transitory computer-readable storage medium, storing computer-readable instructions that, when executed by a node group including a plurality of first nodes and a second node, wherein one of the plurality of first nodes is designated as an aggregation node, cause the node group to implement a node group-based data processing method including:

constructing, by each of the first nodes, a mapping relationship according to a first user identifier of the first node, the mapping relationship being used for mapping the first user identifier to a target value;

performing, by each of the first nodes, homomorphic encryption on a mapping parameter of the mapping relationship, to obtain a mapping parameter ciphertext, and transferring the mapping parameter ciphertext to the second node in the node group;

determining, by the second node, a reference value to which a second user identifier of the second node is mapped under a mapping relationship corresponding to the mapping parameter ciphertext and correspondingly returning one piece of fragment information of the second user identifier corresponding to the reference value and the reference value to a corresponding one of the plurality of first nodes, wherein a quantity of pieces of fragment information of the second user identifier is the same as a quantity of first nodes in the node group;

receiving, by each of the first nodes, the reference value and the fragment information that are correspondingly returned by the second node;

maintaining, by each of the first nodes, when a result obtained after homomorphic decryption is performed on the reference value is consistent with the target value, the fragment information returned corresponding to the reference value, and triggering the aggregation node to collect fragment information maintained in each node in the node group; and aggregating, by the aggregation node, the collected fragment information to obtain a user identifier intersection set of nodes in the node group and aggregating user data corresponding to the user identifier intersection set.

14. The non-transitory computer-readable storage medium according to claim 13, wherein the constructing, by each of the first nodes, a mapping relationship according to a first user identifier comprises:
   converting the first user identifier into an intermediate value; and
   constructing a target polynomial by using the intermediate value as a solution of a polynomial, the target polynomial being used for mapping the first user identifier to a uniform target value; and
   the performing, by each of the first nodes, homomorphic encryption on a mapping parameter of the mapping relationship, to obtain a mapping parameter ciphertext, and transferring the mapping parameter ciphertext to the second node in the node group comprises:
   performing homomorphic encryption on a polynomial coefficient of the target polynomial, to obtain a polynomial coefficient ciphertext, and transferring the polynomial coefficient ciphertext to the second node in the node group.

15. The non-transitory computer-readable storage medium according to claim 13, wherein the performing, by each of the first nodes, homomorphic encryption on a mapping parameter of the mapping relationship, to obtain a mapping parameter ciphertext, and transferring the mapping parameter ciphertext to the second node in the node group comprises:
   obtaining a local key pair generated in a homomorphic encryption manner, the key pair comprising a public key and a private key; and
   performing homomorphic encryption on the mapping parameter of the mapping relationship by using the public key, to obtain the mapping parameter ciphertext, and transferring the mapping parameter ciphertext to the second node in the node group.

16. The non-transitory computer-readable storage medium according to claim 13, wherein fragment information belonging to a same second user identifier corresponds to a same fragment identifier;
   the aggregating, by the aggregation node, the collected fragment information to obtain a user identifier intersection set of nodes in the node group and aggregating user data corresponding to the user identifier intersection set comprises:
   receiving maintained fragment information transmitted by another first node in the node group;
   aggregating, when a quantity of pieces of fragment information corresponding to the same fragment identifier reaches a quantity of first nodes, the fragment information corresponding to the same fragment identifier, to obtain a public user identifier of the nodes in the node group; and
   obtaining the user identifier intersection set of the nodes in the node group according to the public user identifier, to aggregate the user data corresponding to the user identifier intersection set as a training sample of a machine learning mode.

17. The non-transitory computer-readable storage medium according to claim 13, wherein dimensions of the user data in different nodes in the node group are different; and the method further comprises:
   obtaining the user identifier intersection set of the different nodes in the node group;
   locally querying user data corresponding to a public user identifier comprised in the user identifier intersection set; and
   transmitting the queried user data, the transmitted user data being used as the training sample of a machine learning model after being aggregated with the user data transmitted by another node in the node group.

* * * * *